United States Patent
Gholmieh et al.

(10) Patent No.: US 8,831,671 B2
(45) Date of Patent: Sep. 9, 2014

(54) AUTOMATED PARAMETER ADJUSTMENT TO COMPENSATE SELF ADJUSTING TRANSMIT POWER AND SENSITIVITY LEVEL AT THE NODE B

(71) Applicants: Aziz Gholmieh, Del Mar, CA (US); Farhad Meshkati, San Diego, CA (US); Mehmet Yavuz, San Diego, CA (US); Siddharth Mohan, San Diego, CA (US); Christophe Chevallier, San Diego, CA (US)

(72) Inventors: Aziz Gholmieh, Del Mar, CA (US); Farhad Meshkati, San Diego, CA (US); Mehmet Yavuz, San Diego, CA (US); Siddharth Mohan, San Diego, CA (US); Christophe Chevallier, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 13/621,674

(22) Filed: Sep. 17, 2012

(65) Prior Publication Data

US 2013/0016681 A1 Jan. 17, 2013

Related U.S. Application Data

(62) Division of application No. 12/536,896, filed on Aug. 6, 2009, now Pat. No. 8,271,014.

(60) Provisional application No. 61/087,861, filed on Aug. 11, 2008.

(51) Int. Cl.
*H04B 7/00* (2006.01)
*H04W 52/24* (2009.01)
*H04W 52/10* (2009.01)
*H04W 52/36* (2009.01)

(52) U.S. Cl.
CPC ............ *H04W 52/10* (2013.01); *H04W 52/244* (2013.01); *H04W 52/367* (2013.01); *Y02B 60/50* (2013.01); *H04W 52/246* (2013.01)
USPC ........... 455/522; 455/69; 455/63.1; 455/13.4; 455/41.2; 370/329; 370/252

(58) Field of Classification Search
CPC . H04W 52/10; H04W 52/244; H04W 52/246; H04W 52/367; H04W 52/06; H04W 52/08; H04W 52/12; H04W 52/125; H04W 52/14; H04W 52/143; H04W 52/146; H04W 52/16; H04W 52/18; H04W 52/22; Y02B 60/50
USPC ............... 455/69, 522, 63.1, 114.2, 296, 561, 455/436, 453, 13.4, 41.2; 370/318, 329, 370/335, 343, 252
See application file for complete search history.

(56) References Cited

U.S. PATENT DOCUMENTS 5,564,075 A 10/1996 Gourgue
5,715,526 A * 2/1998 Weaver et al. ................ 455/126
(Continued)

FOREIGN PATENT DOCUMENTS

EP 615353 A1 9/1994
JP 7007469 A 1/1995
(Continued)

OTHER PUBLICATIONS

International Search Report and Written Opinion—PCT/US2009/053198—ISA/EPO—Dec. 4, 2009.
(Continued)

*Primary Examiner* — Tan Trinh

(57) ABSTRACT

A small base node such as a Home Base Node (HNB), or femto cell, may reduce its transmit power in order to prevent co-channel or adjacent channel interference, or to limit its coverage area. Once the power is set, the HNB signal to a served Home User Equipment (HUE) its transmit Common Pilot Channel (CPICH) transmit power for accurate path loss estimation. When this power is outside of the permissible range, the HNB adjusts other parameters (such as Random Access Channel (RACH) constant value) to compensate for the error in signaled CPICH power, and thus compensate in that process the error in determining path loss. Similarly, if the uplink sensitivity is adjusted, to prevent interference, parameters would also be adjusted and signaled to the HUE to reflect the link imbalance.

10 Claims, 12 Drawing Sheets

(56) References Cited

U.S. PATENT DOCUMENTS

| | | | |
|---|---|---|---|
| 6,937,583 B1* | 8/2005 | Czaja et al. | 370/331 |
| 8,271,014 B2 | 9/2012 | Gholmieh et al. | |
| 8,515,480 B2* | 8/2013 | Kuroda | 455/522 |
| 8,538,443 B2* | 9/2013 | Vrzic et al. | 455/447 |
| 8,588,696 B2* | 11/2013 | Gaikwad et al. | 455/63.1 |
| 2001/0028639 A1 | 10/2001 | Eikelenboom et al. | |
| 2001/0036849 A1 | 11/2001 | Mortensen et al. | |
| 2004/0252669 A1 | 12/2004 | Hosein | |
| 2005/0136960 A1 | 6/2005 | Timus et al. | |
| 2007/0033618 A1 | 2/2007 | Kiukkonen et al. | |
| 2007/0105580 A1 | 5/2007 | Farnsworth et al. | |
| 2007/0171996 A1 | 7/2007 | Miyabayashi | |
| 2007/0197252 A1* | 8/2007 | Watanabe et al. | 455/522 |
| 2007/0197253 A1* | 8/2007 | Watanabe et al. | 455/522 |
| 2007/0272011 A1 | 11/2007 | Chapa, Jr. et al. | |
| 2007/0298798 A1* | 12/2007 | Hagerman et al. | 455/436 |
| 2008/0045271 A1* | 2/2008 | Azuma | 455/561 |
| 2008/0081655 A1* | 4/2008 | Shin et al. | 455/522 |
| 2008/0220792 A1 | 9/2008 | Fischer | |
| 2009/0061778 A1* | 3/2009 | Vrzic et al. | 455/62 |
| 2009/0097444 A1 | 4/2009 | Lohr et al. | |
| 2009/0111503 A1 | 4/2009 | Pedersen et al. | |
| 2009/0131093 A1 | 5/2009 | Bucknell et al. | |
| 2009/0163238 A1 | 6/2009 | Rao et al. | |
| 2011/0257770 A1 | 10/2011 | Chapa, Jr. et al. | |
| 2011/0300805 A1* | 12/2011 | Gaikwad et al. | 455/63.1 |
| 2013/0035132 A1* | 2/2013 | Shin et al. | 455/522 |

FOREIGN PATENT DOCUMENTS

| | | |
|---|---|---|
| RU | 2210864 C2 | 8/2003 |
| RU | 2324288 C2 | 5/2008 |
| TW | 200428804 | 12/2004 |
| TW | 200824332 A | 6/2008 |
| WO | 2007139680 A2 | 12/2007 |

OTHER PUBLICATIONS

Qualcom Europe, "Interference Management Methods for HNBs," 3GPP TSG-RAN WG4#47-bis R4-081346, Jun. 10, 2008.

Qualcomm Europe: "HNB and Macro Downlink Performance with Calibrated HNB Transmit Power" 3GPP Draft; R4-081344, 3rd Generation Partnership Project (3GPP), Mobile Competence Centre ; 650, Route Des Lucioles ; F-06921 Sophia-Antipolis Cedex ; France, vol. RAN WG4, No. Munich, Germany; Jun. 10, 2008, XP050179935 [retrieved Jun. 10, 2008] paragraphs [0001], [0004], [0009].

Taiwan Search Report—TW098126982—TIPO—Mar. 27, 2013.

Universal Mobile Telecommunications System (UMTS); Radio Resource Control (RRC); Protocol specification (3GPP TS 25.331 version 8.3.0 Release 8); ETSI TS 125 331 ETSI Standard, European Telecommunications Standards Institute ( ETSI ) , Sophia Antipolis Cedex, France, vol. 3-R2, No. V8.3.0, Jul. 1, 2008, XP014042124 cited in the application paragraph [8.5.7] paragraph [10.3.6.11] paragraphs [10.3.6.55], [10.3.6.60], [10.3.6.61].

Motorola: "RAN4 work item description FDD Home NodeB RF requirements", 3GPP TSG RAN Meeting #39, RP-080234, Puerto Vallarta, Mar. 4-6, 2008, 4 Pages.

QUALCOMM Europe: "HNB and HNB-Macro Propagation Models", 3GPP TSG RAN WG4 #44-bis, R4-071617, Shanghai, P.R. China, Oct. 8-12, 2007, 9 Pages.

TR 101 112 V3.2.0 (Apr. 1998), Universal Mobile Telecommunications System (UMTS); Selection procedures for the choice of radio transmission technologies of the UMTS (UMTS 30.03 version 3.2.0), pp. 1-84.

\* cited by examiner

AUTOMATED PARAMETER ADJUSTMENT TO COMPENSATE SELF ADJUSTING TRANSMIT POWER AND SENSITIVITY LEVEL AT THE NODE B

CLAIM OF PRIORITY UNDER 35 U.S.C. §119

The present application is a divisional of U.S. application Ser. No. 12/536,896 entitled "AUTOMATED PARAMETER ADJUSTMENT TO COMPENSATE SELF ADJUSTING TRANSMIT POWER AND SENSITIVITY LEVEL AT THE NODE B," filed Aug. 6, 2009, which claimed priority to U.S. Provisional Application No. 61/087,861 entitled "NODE B TRANSMIT POWER ADJUSTMENT," filed Aug. 11, 2008, and assigned to the assignee hereof and hereby expressly incorporated by reference herein.

BACKGROUND

1. Field

The present disclosure relates generally to communication, and more specifically signaling uplink transmit power to user equipment (UE) in a wireless communication network.

2. Background

In third generation wireless mobile communication technology, the Universal Mobile Telecommunication System (UMTS), also known as 3GSM (Third Generation Global System for Mobile Communications), is one communication protocol used for communications on a wireless network. One such type of wireless network is a UMTS Terrestrial Radio Access Network (UTRAN) which typically includes base stations and controllers to form the UMTS wireless network. This wireless communications network, commonly referred to as a 3G (for Third Generation) network, can carry many traffic types, from real-time circuit switched traffic to Internet Protocol (IP)-based packet switched traffic. The UTRAN allows connectivity between user equipment (UE), such as mobile phones or wireless communication devices, and to devices on other communication networks.

Base stations typically include transmitters and receivers used to communicate directly with the UE, which may move freely around a network. A Radio Network Controller (RNC) governs communications on the UTRAN by controlling the operation of the base stations on the network. The RNC carries out radio resource management, some of the mobility management functions and is the point where encryption is done before user data is sent to and from Mobile User Equipment (MUE).

Under UTRAN, the RNC can configure UEs operating within the network to operate according to particular communication system parameters. (See 3GPP Technical Specification 25.331) For example, during initiation or reconfiguration, a Radio Bearer Setup message may be sent by the RNC to a UE that configures a transmitter and/or receiver in the UE to operate according to parameters (e.g., combination of transmitted and received data blocks, mapping between channels and services, etc.) sent in the Radio Bearer Setup message. The UE may receive a new Radio Bearer Setup message when it is started or when it awakes from a standby mode. For example, a UE may be configured to conserve power by switching its transmitter and/or receiver On and Off, causing it to have to reset its transmitter and/or receiver parameters.

In some scenarios, a RNC, such as a base station or base node, wishes to use a transmit power that is outside the range that can be signaled in a certain release of the specification. Later releases of the specifications can expand this range, but the older UEs or Mobile Stations (MSs) that are in the field will not understand these new fields. This signaled power is used at the UE mainly for path loss estimation.

SUMMARY

The following presents a simplified summary in order to provide a basic understanding of some aspects of the disclosed aspects. This summary is not an extensive overview and is intended to neither identify key or critical elements nor delineate the scope of such aspects. Its purpose is to present some concepts of the described features in a simplified form as a prelude to the more detailed description that is presented later.

In one aspect, a method is provided for signaling on a downlink adjusted parameters to accurately set a transmit power level for an uplink by employing a processor executing computer executable instructions stored on a computer readable storage medium to implement following acts: A target transmit power level that is desired for user equipment that is outside of a defined range for a power command by an offset value is determined. A power command is transmitted at a value within the defined range that is closest to the target transmit power level. A mitigation signal is transmitted based upon the offset value. An uplink channel is received at the target transmit power level, wherein the user equipment adjusts transmit power from the power command according to the mitigation signal.

In another aspect, a computer program product is provided for signaling on a downlink adjusted parameters to accurately set a transmit power level for an uplink. At least one computer readable storage medium stores computer executable instructions that, when executed by at least one processor, implement components: A first set of codes determines a target transmit power level that is desired for user equipment that is outside of a defined range for a power command by an offset value. A second set of codes transmits a power command at a value within the defined range that is closest to the target transmit power level. A third set of codes transmits a mitigation signal based upon the offset value. A fourth set of codes receives an uplink channel at the target transmit power level, wherein the user equipment adjusts transmit power from the power command according to the mitigation signal.

In an additional aspect, an apparatus is provided for signaling on a downlink adjusted parameters to accurately set a transmit power level for an uplink. At least one computer readable storage medium stores computer executable instructions that, when executed by at least one processor, implement components: Means are provided for determining a target transmit power level that is desired for user equipment that is outside of a defined range for a power command by an offset value. Means are provided for transmitting a power command at a value within the defined range that is closest to the target transmit power level. Means are provided for transmitting a mitigation signal based upon the offset value. Means are provided for receiving an uplink channel at the target transmit power level, wherein the user equipment adjusts transmit power from the power command according to the mitigation signal.

In another additional aspect, an apparatus is provided for signaling on a downlink adjusted parameters to accurately set a transmit power level for an uplink. A computing platform determines a target transmit power level that is desired for user equipment that is outside of defined range for a power command by an offset value. A transmitter transmits a power command at a value within the defined range that is closest to the target transmit power level and for transmitting a mitigation signal based upon the offset value. A receiver receives an uplink channel at the target transmit power level, wherein the user equipment adjusts transmit power from the power command according to the mitigation signal.

In a further aspect, a method employs a processor executing computer executable instructions stored on a computer readable storage medium to implement following acts: An actual transmit power is determined that results in common pilot channel power outside of a valid range. A value is transmitted on a downlink for common pilot channel power at a lowest valid value. A constant value is transmitted according to the actual transmit power. A random access channel preamble is received from user equipment according to an actual path loss based upon the value for common pilot channel power and the constant value.

In yet one aspect, a computer program product comprises at least one computer readable storage medium storing computer executable instructions that, when executed by at least one processor, implement components: A first set of codes determines that an actual transmit power that results in common pilot channel power outside of a valid range. A second set of codes transmits on a downlink a value for common pilot channel power at a lowest valid value. A third set of codes transmits a constant value according to the actual transmit power. A fourth set of codes receives a random access channel preamble from user equipment according to an actual path loss based upon the value for common pilot channel power and the constant value.

In yet another aspect, an apparatus comprises at least one computer readable storage medium for storing computer executable instructions that, when executed by at least one processor, implement components: Means are provided for determining that an actual transmit power that results in common pilot channel power outside of a valid range. Means are provided for transmitting on a downlink a value for common pilot channel power at a lowest valid value. Means are provided for transmitting a constant value according to the actual transmit power. Means are provided for receiving a random access channel preamble from user equipment according to an actual path loss based upon the value for common pilot channel power and the constant value.

In yet an additional aspect, an apparatus comprises a computing platform for determining that an actual transmit power that results in common pilot channel power outside of a valid range. A transmitter transmits on a downlink a value for common pilot channel power at a lowest valid value and transmits a constant value according to the actual transmit power. A receiver receives a random access channel preamble from user equipment according to an actual path loss based upon the value for common pilot channel power and the constant value.

In yet another additional aspect, a method employs a processor executing computer executable instructions stored on a computer readable storage medium to implement the following acts: Interference is mitigated by reducing uplink receiving to an actual sensitivity. A parameter is adjusted to force user equipment to transmit a random access channel preamble at a value corresponding to the actual sensitivity. The adjusted parameter is transmitted to the user equipment. The random access channel preamble is received.

In yet a further aspect, a computer program product comprises at least one computer readable storage medium for storing computer executable instructions that, when executed by at least one processor, implement components: A first set of codes mitigates interference by reducing uplink receiving to an actual sensitivity. A second set of codes adjusts a parameter to force user equipment to transmit a random access channel preamble at a value corresponding to the actual sensitivity. A third set of codes transmits the adjusted parameters to the user equipment. A fourth set of codes receives the random access channel preamble.

In another further aspect, an apparatus comprises at least one computer readable storage medium storing computer executable instructions that, when executed by at least one processor, implement components: Means are provided for mitigating interference by reducing uplink receiving to an actual sensitivity. Means are provided for adjusting a parameter to force user equipment to transmit a random access channel preamble at a value corresponding to the actual sensitivity. Means are provided for transmitting the adjusted parameters to the user equipment. Means are provided for receiving the random access channel preamble.

In an additional further aspect, an apparatus comprises a computing platform for mitigating interference by reducing uplink receiving to an actual sensitivity and for adjusting a parameter to force user equipment to transmit a random access channel preamble at a value corresponding to the actual sensitivity. A transmitter transmits the adjusted parameters to the user equipment. A receiver receives the random access channel preamble.

To the accomplishment of the foregoing and related ends, one or more aspects comprise the features hereinafter fully described and particularly pointed out in the claims. The following description and the annexed drawings set forth in detail certain illustrative aspects and are indicative of but a few of the various ways in which the principles of the aspects may be employed. Other advantages and novel features will become apparent from the following detailed description when considered in conjunction with the drawings and the disclosed aspects are intended to include all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout and wherein.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
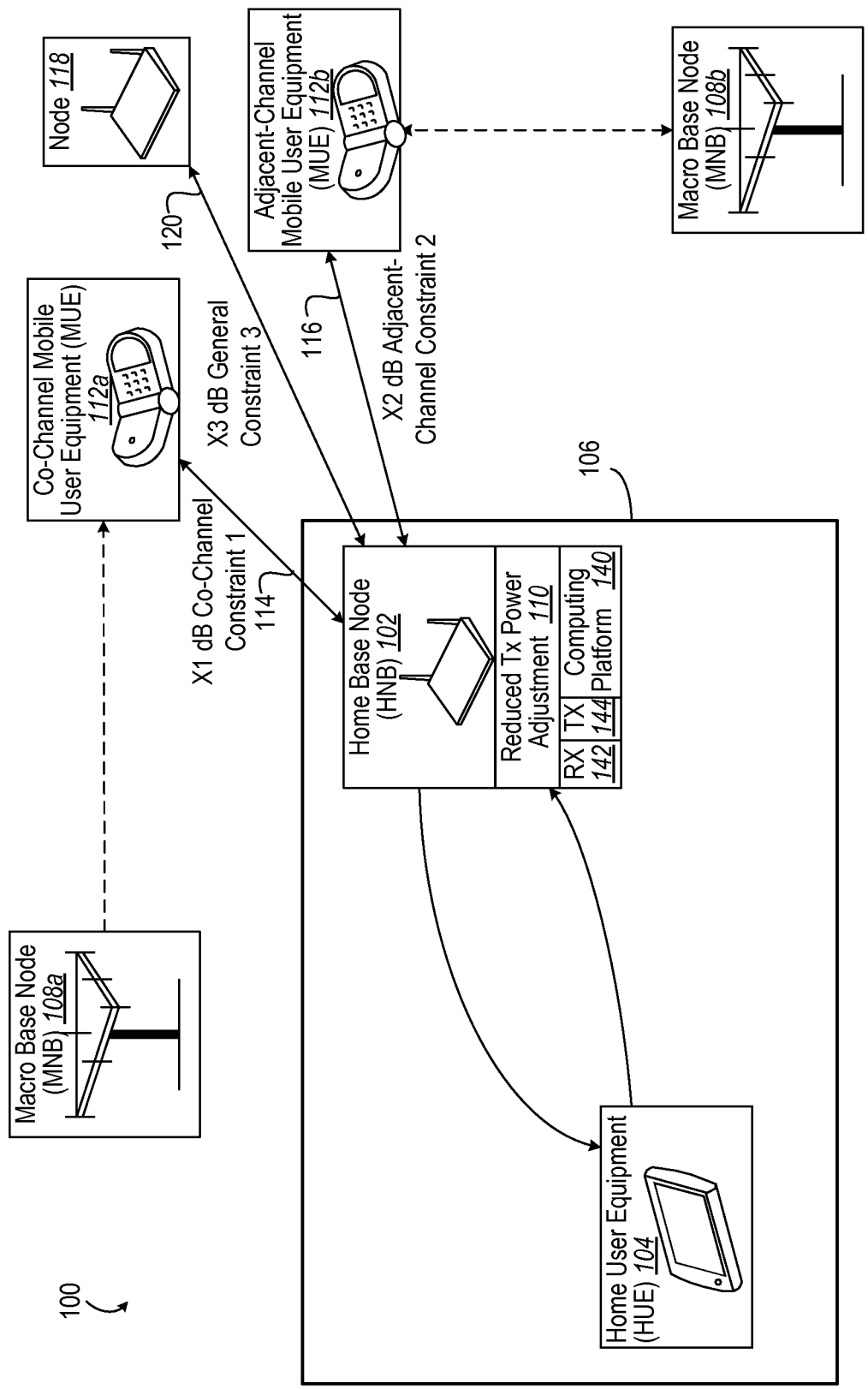
FIG. 1 illustrates a block diagram of a heterogeneous communication network wherein a Home Base Node (HNB) can signal an out-of-range transmit power command on a downlink for a Home User Equipment (HUE) to use on an uplink.

In FIG. 1, in a heterogeneous communication system 100, a small base node (e.g., Home Base Node (HNB), femtocell, closed subscription cell, etc.) 102, depicted as HNB, serves user equipment (UE) 104, depicted as Home User Equipment (HUE). For instance, the HNB 102 can be placed within a building 106 to extend coverage area of or to provide an advantageous billing alternative over one of a plurality of Macro Base Nodes (MNBs) 108a, 108b.

Advantageously, the HNB 102 has a reduced Transmit (Tx) power component 110 that seeks to determine a sufficient Transmit (Tx) power to avoid interference to other nodes or to terminals while providing sufficient service to a Mobile User Equipment MUE 112a. For instance, the MNB 108a can be serving the MUE 112a that is co-channel with the HNB 102. The HNB 102 can advantageously reduce its Tx power to maintain a Common Pilot Channel (CPICH) Ec/No (energy per chip to interference power density) of −18 dB for the MUE 112a that is located X1 dB away from the HNB 102 as a first constraint depicted at 114.

Alternatively or in addition, the MNB 108b can be serving MUE 112b that is served on an adjacent channel with the HNB 102. The HNB 102 can reduce its CPICH Tx power to avoid adjacent channel interference for the MUE 112b that is located X2 away from the HNB 102 to prevent adjacent co-channel interference as depicted at 116.

Alternatively or in addition, to make sure that the HNB 102 is not causing unnecessary interference to others (e.g., nodes or User Equipment (UE)) 118, the HNB 102 can enforce a cap on CPICH Ec/No of −15 dB as reported as depicted at 120 by the HUE 104 that is located X3 dB away from the HNB 102.

In particular, the HNB 102 signals CPICH Transmit (Tx) power to the HUE 104 by Radio Resource Control (RRC) and is used by the HUE 104 to estimate the path loss to the HNB 102. The estimated path loss is used by the HUE 104 for determining the its initial Tx power for Random Access Channel (RACH):

Preamble_Initial_Power=Primary CPICH Tx power−
CPICH_RSCP+UL interference+Constant Value Currently, the lowest CPICH power level that can be signaled to the UE is −10 dBm as specified in 3GPP TS 25.331 v8.3.0, "Radio Resource Control (RRC); Protocol specification". When the Node B/HNB CPICH Tx power is below −10 dBm, the estimated path loss by the UE (i.e., Primary CPICH Tx power−CPICH_RSCP) will be higher than the actual path loss. This will result in a higher Tx power by the UE than necessary. The increase in the UE Tx power will expedite the access but at same time causes unnecessary interference for the macro uplink.

In an exemplary aspect, currently, a new base station class for Third Generation (3G) Home Base Node (HNB) is being defined. One of the objectives is to update the radio requirements in TS 25.104 for HNBs. Although the minimum HNB transmit power is not part of the specifications, the lower limit should be set appropriately to limit the coverage hole created for a macrocell downlink. In the disclosed innovation, the total HNB Transmit (Tx) power may need to go lower than 0 dBm, which will result in a Common Pilot CHannel (CPICH) power level below −10 dBm, assuming CPICH Ec/Ior=−10 dB, which is the minimum level that can currently be signaled to the UE. This could potentially result in a mismatch between the signal CPICH Tx power and the actual power level, which would increase Home User Equipment (HUE) open-loop Tx power level for Random Access Channel (RACH). However, the mismatch advantageously can be compensated by adjusting the Constant Value parameter for RACH.

Thus, the Macro Base Nodes (MNBs)/HNB can use the Constant Value parameter or the Uplink (UL) interference parameter to compensate for the mismatch between the actual CPICH Tx power level and the one signaled to the UE. The MNB/HNB will advertise the lowest possible value in this case. The allowed range for the Constant Value parameter is specified as [−35 dB . . . −10 dB]. The Constant Value signaled to the UE can be made lower than the desired target to offset the increase in the estimated Path Loss (PL) resulted from the mismatch in CPICH Tx power. The same mechanism can be applied to the upper limit using the Uplink (UL) interference parameter.

In another aspect, when path loss is the selected reporting quantity, adjustments can be provided when a defined range for path loss is insufficient to convey an actual value. In this instance, mitigation can be achieved by using Cell Individual Offset (CIO).

In an additional aspect, an HNB can adjust its receive sensitivity such that a desired uplink transmit power level for UE is outside of a range that can be directly commanded. For instance, if the HNB decreases its sensitivity, such as to mitigate interference, the UE can transmit at too low of a power level to reach the HNB. Thus, the HNB indirectly commands with a mitigating signal. In particular, in order to prevent the HUE from transmitting at too low of a power to reach the HNB, the HNB needs to indirectly signal its sensitivity using either the constant value or the uplink interference value.

In another aspect, when path loss is the selected reporting quantity, adjustments also need to be considered. In this instance, the adjustments can be done using Cell Individual Offset (CIO).

In a further aspect, the HNB adjusts its receive sensitivity for an uplink, which can create a similar problem in conveying settings to a served HUE. With the reduced sensitivity, the HUE can transmit at too low a transmit power in order to reach the HNB. Thus, the HNB needs to indirectly signal its sensitivity, using either constant value or the UL interference value.

The HNB 102 can contain a computing platform 140 that executes instructions locally or remotely stored in computer-readable storage media by at least one processor for performing the foregoing computing and control steps. The HNB 102 can further contain or have access to at least one receiver (RX) 142 for receiving an uplink from the HUE 104. The HNB 102 can further contain or have access to at least one transmitter (Tx) 144 for transmitting a downlink to the HUE 104.

Figure 2:
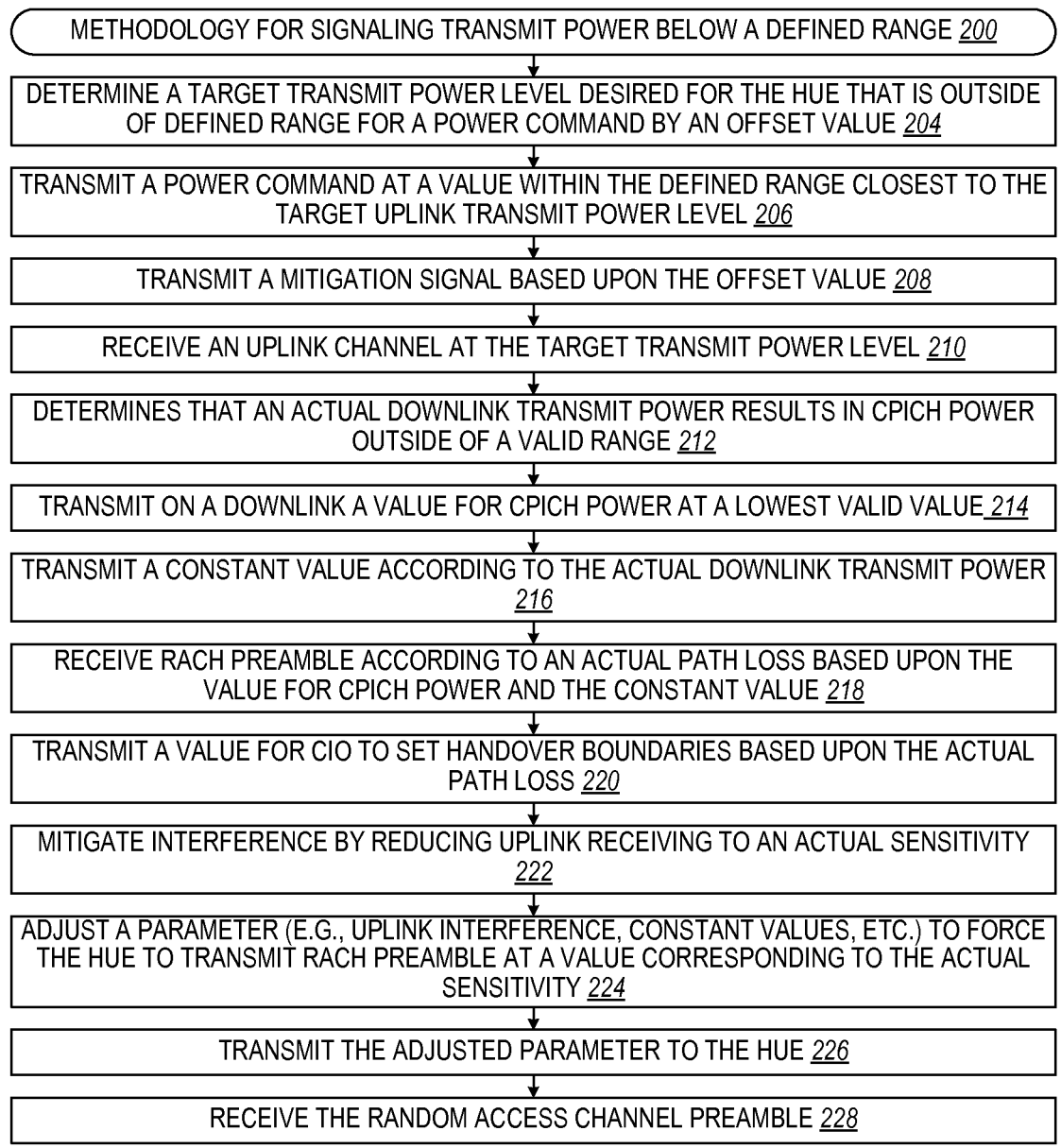
FIG. 2 illustrates a flow diagram for a methodology or sequence of operations for signaling transmit power outside of a defined valid range.

In FIG. 2, a methodology or sequence of operations 200 is provided for signaling transmit power below a defined valid range, in particular for an HNB to signal on a downlink to an HUE a transmit power level for an uplink in a closed subscriber system. The HNB determines a target transmit power level that is desired for the HUE that is outside of a defined range for a power command by an offset value (block 204). The HNB transmits a power command to the HUE at a value within the defined range that is closest to the target transmit power level (block 206). The HNB transmits a mitigation signal to the HUE based upon the offset value (block 208). The HNB receives an uplink channel at the target transmit power level (block 210), wherein the HUE adjusts transmit power from the power command according to the mitigation signal.

In one aspect, the HNB determines that an actual transmit power results in Common Pilot Channel (CPICH) power outside of a valid range (block 212). The HNB transmits on a downlink a value for CPICH power at a lowest valid value (block 214). The HNB transmits a constant value according to the actual transmit power (block 216). The HNB receives a Random Access Channel (RACH) preamble from HUE according to an actual path loss based upon the value for CPICH power and the constant value (block 218). The HNB can further transmit a value for Cell Individual Offset (CIO) to set handover boundaries based upon the actual path loss (block 220).

In another aspect, the HNB mitigates interference by reducing uplink receiving to an actual sensitivity (block 222). The HNB adjusts a parameter (e.g., uplink interference, constant values, etc.) to force the HUE to transmit RACH preamble at a value corresponding to the actual sensitivity (block 224). The HNB transmits the adjusted parameter to the HUE (block 226). The HNB receives the random access channel preamble (block 228).

Throughout this disclosure, for clarity an assumption is made for co-channel deployment where HUEs and MUEs share the same carrier. A closed subscriber group is assumed throughout. However, it should be appreciated with the benefit of the present disclosure that aspects consistent with the present innovation can include exceptions to these assumptions and those that follow. In one aspect, a UE is deemed unable to acquire the pilot if the Common Pilot Channel (CPICH) Ec/No (energy per chip to interference power density) is below an acquisition time value (Tacq). For this analysis, Tacq=−20 dB is used. In addition, the Macro Base Nodes (MNBs) are assumed to transmit at 50% of the full power (i.e., 40 dBm). The CPICH Ec/Ior for MNBs and HNBs are set to −10 dB (i.e., 33 dBm).

In some aspects the teachings herein may be employed in a network that includes macro scale coverage (e.g., a large area cellular network such as a 3G networks, typically referred to as a macro cell network) and smaller scale coverage (e.g., a residence-based or building-based network environment). As UE moves through such a network, UE may be served in certain locations by Node Bs that provide macro coverage while UE may be served at other locations by Node Bs that provide smaller scale coverage. In some aspects, the smaller coverage nodes may be used to provide incremental capacity growth, in-building coverage, and different services (e.g., for a more robust user experience). In the discussion herein, a node that provides coverage over a relatively large area may be referred to as a macro node. A node that provides coverage over a relatively small area (e.g., a residence) may be referred to as a femto node. A node that provides coverage over an area that is smaller than a macro area and larger than a femto area may be referred to as a pico node (e.g., providing coverage within a commercial building).

A cell associated with a macro node, a femto node, or a pico node may be referred to as a macro cell, a femto cell, or a pico cell, respectively. In some implementations, each cell may be further associated with (e.g., divided into) one or more sectors.

In various applications, other terminology may be used to reference a macro node, a femto node, or a pico node. For example, a macro node may be configured or referred to as a Node B, base station, access point, eNodeB, macro cell, and so on. Also, a femto node may be configured or referred to as a Home NodeB, Home eNodeB, access point base station, femto cell, and so on.

Figure 3:
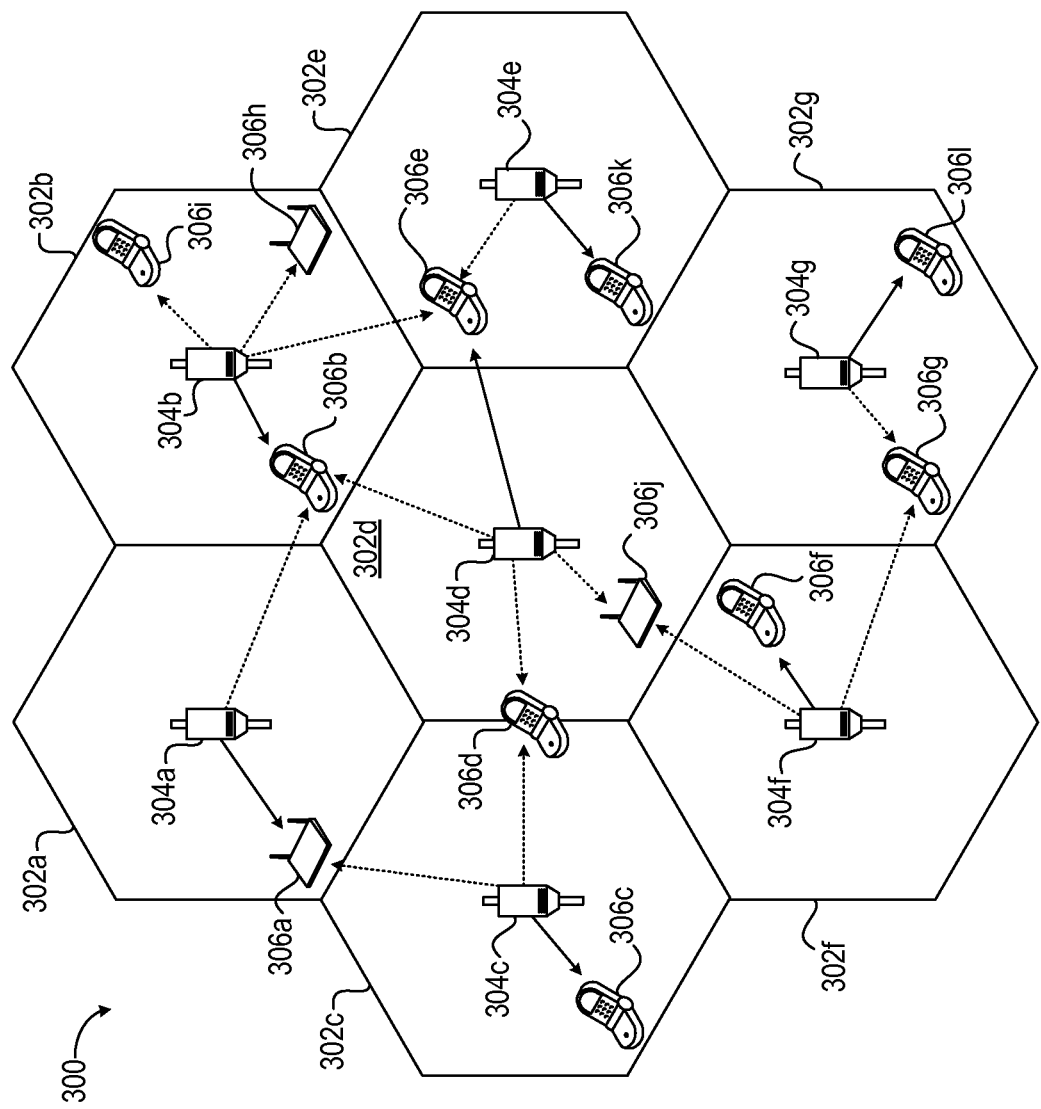
FIG. 3 illustrates a diagram of a wireless communication system comprising macro cells, femto cells and pico cells.

FIG. 3 illustrates a wireless communication system 300, configured to support a number of users, in which the teachings herein may be implemented. The system 300 provides communication for multiple cells 302, such as, for example, macro cells 302*a*-302*g*, with each cell being serviced by a corresponding base node 304 (e.g., base nodes 304*a*-304*g*). As shown in FIG. 3, UEs 306 (e.g., UEs 306*a*-306*l*) may be dispersed at various locations throughout the system over time. Each UE 306 may communicate with one or more base nodes 304 on a forward link ("FL") and/or a reverse link ("RL") at a given moment, depending upon whether UE 306 is active and whether it is in soft handoff, for example. The wireless communication system 300 may provide service over a large geographic region. For example, macro cells 302*a*-302*g* may cover a few blocks in a neighborhood.

Figure 4:
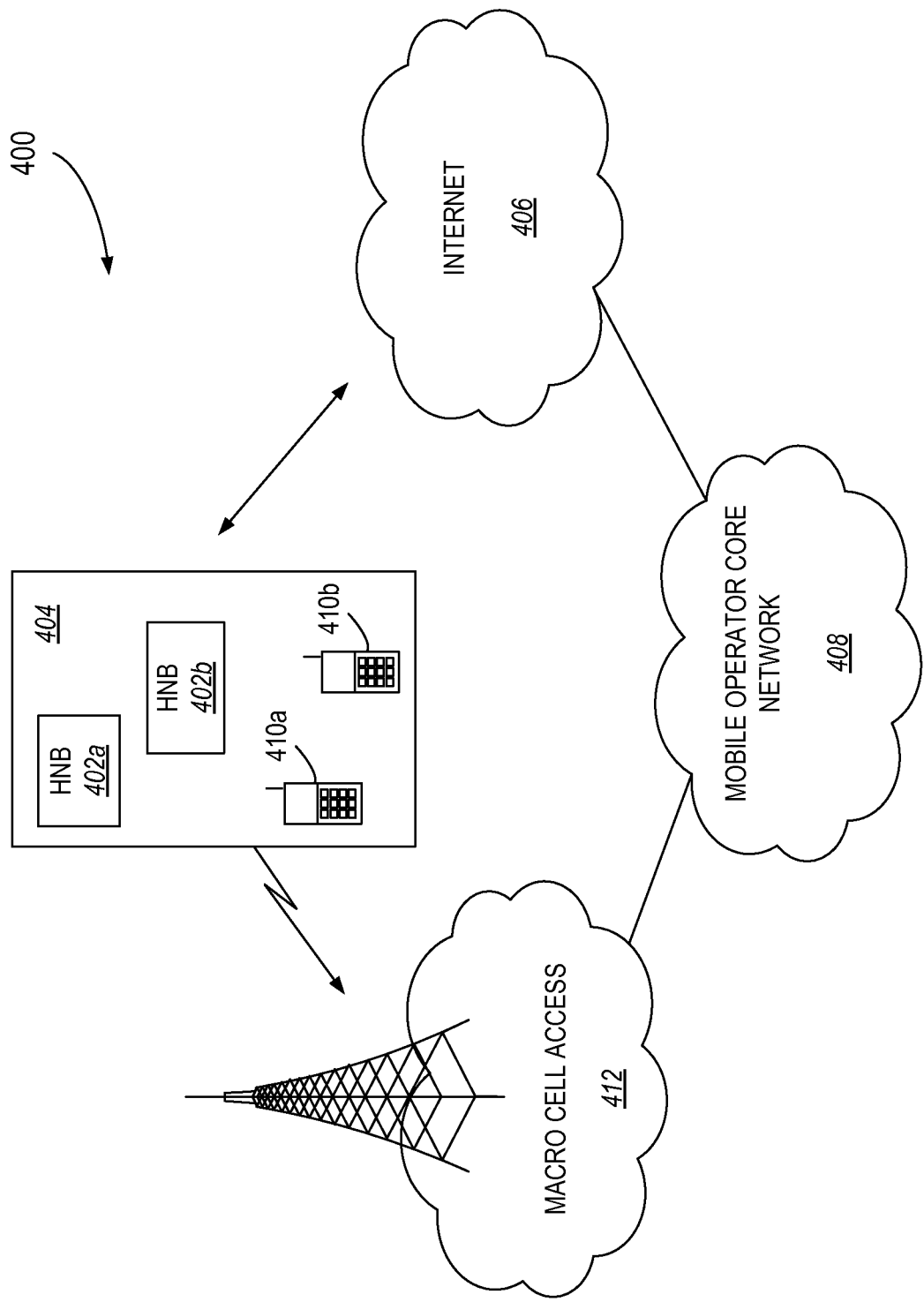
FIG. 4 illustrates a diagram of a communication system where one or more femto nodes are deployed within a network environment.

FIG. 4 illustrates an exemplary communication system 400 where one or more femto nodes are deployed within a network environment. Specifically, the system 400 includes multiple femto nodes, depicted as Home Base Nodes (HNBs) 402*a* and 402*b*, installed in a relatively small scale network environment (e.g., in one or more user residences 404). Each femto node 402*a*-402*b* may be coupled to a wide area network 406 (e.g., the Internet) and a mobile operator core network 408 via a DSL router, a cable modem, a wireless link, or other connectivity means (not shown). As will be discussed below, each femto node 402*a*-402*b* may be configured to serve associated access terminals or user equipment (UE) 410*a* and, optionally, alien access UEs 410*b* (e.g., not a subscriber to a closed subscriber group). In other words, access to femto nodes 402*a*-402*b* may be restricted whereby a given UE 410*a*-410*b* may be served by a set of designated (e.g., home) femto node(s) 402*a*-402*b* but may not be served by any non-designated femto nodes 402*a*-402*b* (e.g., a neighbor's femto node 402*a*-402*b*).

The owner of a femto node 410 may subscribe to mobile service, such as, for example, 3G mobile service, offered through the mobile operator core network 408. In addition, an access terminal or UE 410*a*-410*b* may be capable of operating both in macro environments and in smaller scale (e.g., residential) network environments. In other words, depending on the current location of the UE 410*a*-410*b*, the access terminal 410*a*-410*b* may be served by an access node or macro base node 412 of the macro cell mobile network 408 or by any one of a set of femto nodes 410 (e.g., the femto nodes 402*a*-402*b* that reside within a corresponding user residence 404). For example, when a subscriber is outside his home, he is served by a standard macro access node (e.g., node 412) and when the subscriber is at home, he is served by a femto node (e.g., node 402a-402b). Here, it should be appreciated that a femto node 402a-402b may be backward compatible with existing access terminals or UEs 410a-410b.

A femto node 402a-402b may be deployed on a single frequency or, in the alternative, on multiple frequencies. Depending on the particular configuration, the single frequency or one or more of the multiple frequencies may overlap with one or more frequencies used by a macro node (e.g., node 412).

In some aspects, an access terminal or UE 410a-410b may be configured to connect to a preferred femto node (e.g., the home femto node of the access terminal or UE 410a-410b) whenever such connectivity is possible. For example, whenever the access terminal or UE 410a-410b is within the user's residence 404, it may be desired that the access terminal or UE 410a-410b communicate only with the home femto node 402a-402b.

In some aspects, if the access terminal or UE 410a-410b operates within the macro cellular network 408 but is not residing on its most preferred network (e.g., as defined in a preferred roaming list), the access terminal or UE 410a-410b may continue to search for the most preferred network (e.g., the preferred femto node 402a-402b) using a Better System Reselection ("BSR"), which may involve a periodic scanning of available systems to determine whether better systems are currently available, and subsequent efforts to associate with such preferred systems. With the acquisition entry, the access terminal or UE 410a-410b may limit the search for specific band and channel. For example, the search for the most preferred system may be repeated periodically. Upon discovery of a preferred femto node 402a-402b, the access terminal 410a-410b selects the femto node 402a-402b for camping within its coverage area.

A femto node may be restricted in some aspects. For example, a given femto node may only provide certain services to certain access terminals. In deployments with so-called restricted (or closed) association, a given access terminal may only be served by the macro cell mobile network and a defined set of femto nodes (e.g., the femto nodes 402a-402b that reside within the corresponding user residence 404). In some implementations, a node may be restricted to not provide, for at least one node, at least one of: signaling, data access, registration, paging, or service.

In some aspects, a restricted femto node (which may also be referred to as a Closed Subscriber Group Home NodeB) is one that provides service to a restricted provisioned set of access terminals. This set may be temporarily or permanently extended as necessary. In some aspects, a Closed Subscriber Group ("CSG") may be defined as the set of access nodes (e.g., femto nodes) that share a common access control list of access terminals. A channel on which all femto nodes (or all restricted femto nodes) in a region operate may be referred to as a femto channel.

Various relationships may thus exist between a given femto node and a given access terminal or user equipment. For example, from the perspective of an access terminal, an open femto node may refer to a femto node with no restricted association. A restricted femto node may refer to a femto node that is restricted in some manner (e.g., restricted for association and/or registration). A home femto node may refer to a femto node on which the access terminal is authorized to access and operate on. A guest femto node may refer to a femto node on which an access terminal is temporarily authorized to access or operate on. An alien femto node may refer to a femto node on which the access terminal is not authorized to access or operate on, except for perhaps emergency situations (e.g., 911 calls).

From a restricted femto node perspective, a home access terminal may refer to an access terminal that authorized to access the restricted femto node. A guest access terminal may refer to an access terminal with temporary access to the restricted femto node. An alien access terminal may refer to an access terminal that does not have permission to access the restricted femto node, except for perhaps emergency situations, for example, such as 911 calls (e.g., an access terminal that does not have the credentials or permission to register with the restricted femto node).

For convenience, the disclosure herein describes various functionality in the context of a femto node. It should be appreciated, however, that a pico node may provide the same or similar functionality for a larger coverage area. For example, a pico node may be restricted, a home pico node may be defined for a given access terminal, and so on.

A wireless multiple-access communication system may simultaneously support communication for multiple wireless access terminals. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system.

Figure 5:
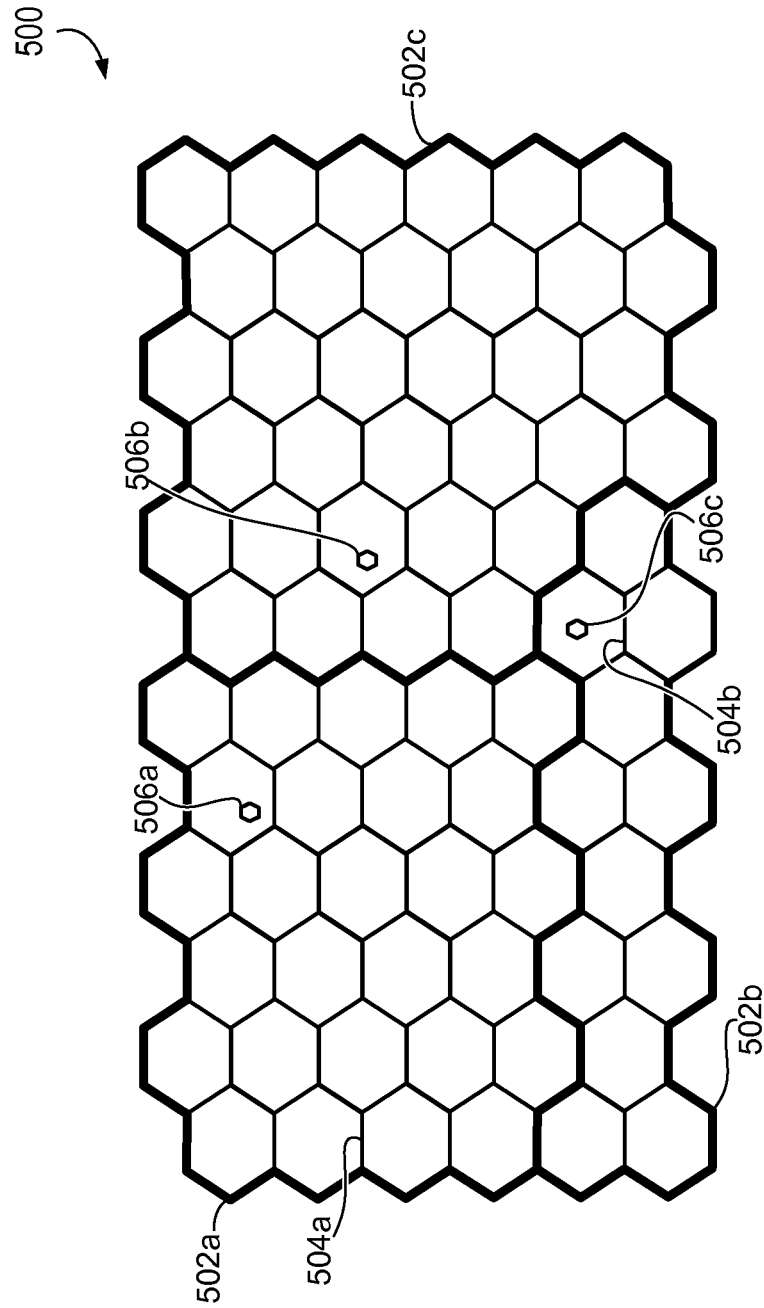
FIG. 5 illustrates a diagram of a coverage map where several tracking areas, routing areas or location areas are defined.

FIG. 5 illustrates an example of a coverage map 500 where several tracking areas 502 (or routing areas or location areas) are defined, each of which includes several macro coverage areas 504. Here, areas of coverage associated with tracking areas 502a, 502b, and 502c are delineated by the wide lines and the macro coverage areas 504 are represented by the hexagons. The tracking areas 502 also include femto coverage areas 506. In this example, each of the femto coverage areas 506 (e.g., femto coverage area 506c) is depicted within a macro coverage area 504 (e.g., macro coverage area 504b). It should be appreciated, however, that a femto coverage area 506 may not lie entirely within a macro coverage area 504. In practice, a large number of femto coverage areas 506 may be defined with a given tracking area 502 or macro coverage area 504. Also, one or more pico coverage areas (not shown) may be defined within a given tracking area 502 or macro coverage area 504.

In particular, a wireless multiple-access communication system may simultaneously support communication for multiple wireless UEs. As mentioned above, each terminal may communicate with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-in-single-out system, a multiple-in-multiple-out ("MIMO") system, or some other type of system. It should be appreciated that the present innovation is not limited to use in a MIMO system described herein as an exemplary implementation.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex ("TDD") and frequency division duplex ("FDD"). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 6:
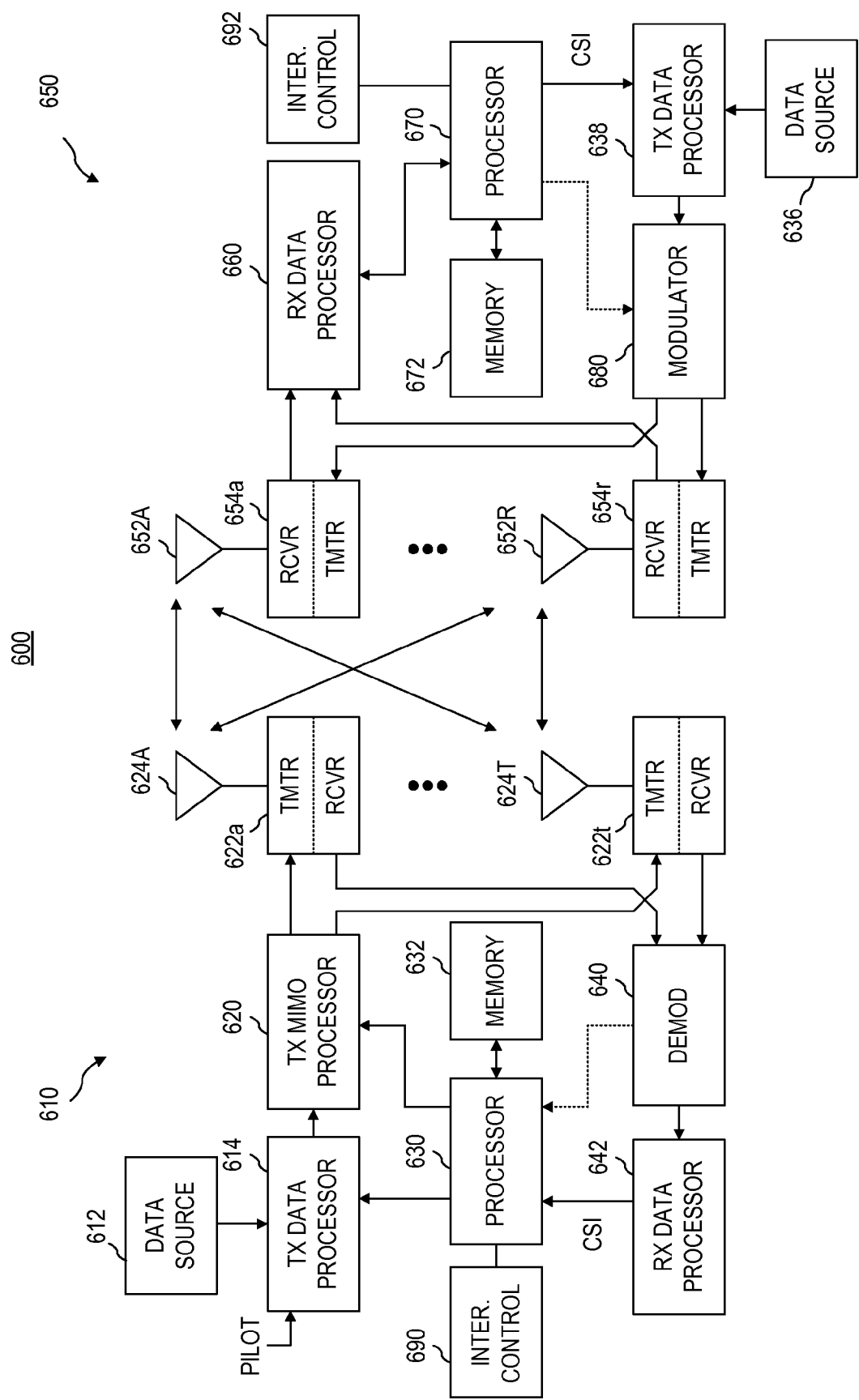
FIG. 6 illustrates a diagram of a multiple access wireless communication system.

The teachings herein may be incorporated into a node (e.g., a device) employing various components for communicating with at least one other node. FIG. 6 depicts several sample components that may be employed to facilitate communication between nodes. Specifically, FIG. 6 illustrates a wireless device 610 (e.g., an access point) and a wireless device 650 (e.g., an access terminal) of a MIMO system 600. At the device 610, traffic data for a number of data streams is provided from a data source 612 to a transmit ("TX") data processor 614.

In some aspects, each data stream is transmitted over a respective transmit antenna. The TX data processor 614 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 630. A data memory 632 may store program code, data, and other information used by the processor 630 or other components of the device 610.

The modulation symbols for all data streams are then provided to a TX MIMO processor 620, which may further process the modulation symbols (e.g., for OFDM). The TX MIMO processor 620 then provides $N_T$ modulation symbol streams to $N_T$ transceivers ("XCVR") 622a through 622t that each has a transmitter (TMTR) and receiver (RCVR). In some aspects, the TX MIMO processor 620 applies beam-forming weights to the symbols of the data streams and to the antenna from which the symbol is being transmitted.

Each transceiver 622a-622t receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 622a through 622t are then transmitted from $N_T$ antennas 624a through 624t, respectively.

At the device 650, the transmitted modulated signals are received by $N_R$ antennas 652a through 652r and the received signal from each antenna 652a-652r is provided to a respective transceiver ("XCVR") 654a through 654r. Each transceiver 654a-654r conditions (e.g., filters, amplifies, and downconverts) a respective received signal, digitizes the conditioned signal to provide samples, and further processes the samples to provide a corresponding "received" symbol stream.

A receive ("RX") data processor 660 then receives and processes the $N_R$ received symbol streams from $N_R$ transceivers 654a-654r based on a particular receiver processing technique to provide $N_T$ "detected" symbol streams. The RX data processor 660 then demodulates, deinterleaves, and decodes each detected symbol stream to recover the traffic data for the data stream. The processing by the RX data processor 660 is complementary to that performed by the TX MIMO processor 620 and the TX data processor 614 at the device 610.

A processor 670 periodically determines which pre-coding matrix to use. The processor 670 formulates a reverse link message comprising a matrix index portion and a rank value portion. A data memory 672 may store program code, data, and other information used by the processor 670 or other components of the device 650.

The reverse link message may comprise various types of information regarding the communication link and/or the received data stream. The reverse link message is then processed by a TX data processor 638, which also receives traffic data for a number of data streams from a data source 636, modulated by a modulator 680, conditioned by the transceivers 654a through 654r, and transmitted back to the device 610.

At the device 610, the modulated signals from the device 650 are received by the antennas 624a-624t, conditioned by the transceivers 622a-622t, demodulated by a demodulator ("DEMOD") 640, and processed by a RX data processor 642 to extract the reverse link message transmitted by the device 650. The processor 630 then determines which pre-coding matrix to use for determining the beam-forming weights then processes the extracted message.

FIG. 6 also illustrates that the communication components may include one or more components that perform interference control operations. For example, an interference ("INTER.") control component 690 may cooperate with the processor 630 and/or other components of the device 610 to send/receive signals to/from another device (e.g., device 650). Similarly, an interference control component 692 may cooperate with the processor 670 and/or other components of the device 650 to send/receive signals to/from another device (e.g., device 610). It should be appreciated that for each device 610 and 650 the functionality of two or more of the described components may be provided by a single component. For example, a single processing component may provide the functionality of the interference control component 690 and the processor 630 and a single processing component may provide the functionality of the interference control component 692 and the processor 670.

Figure 7:
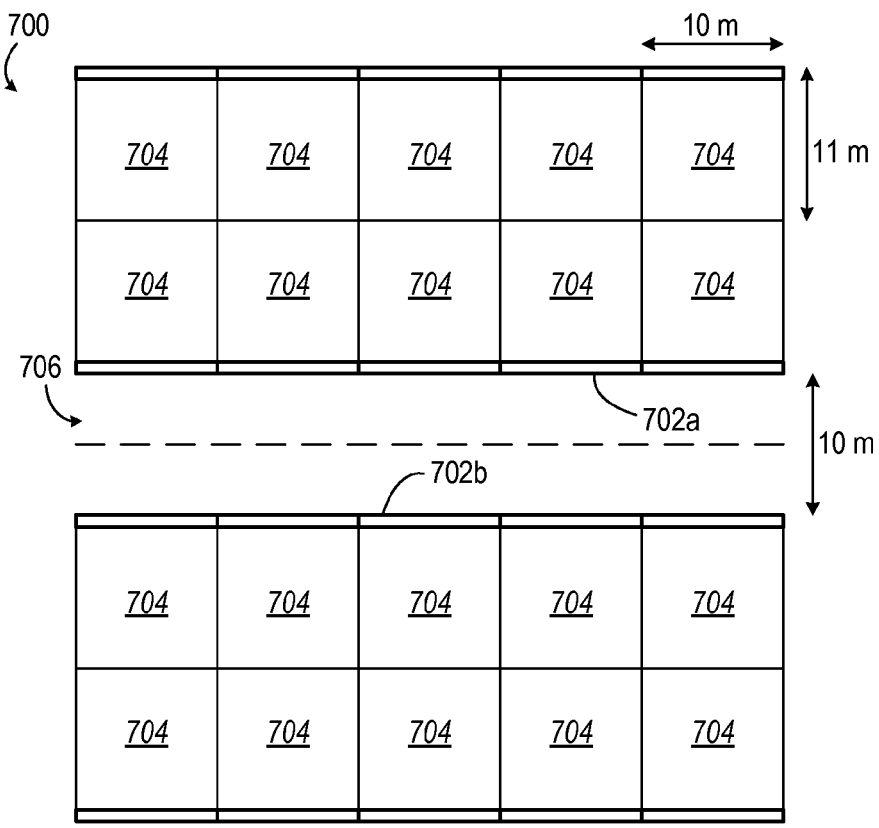
FIG. 7 depicts a diagram of an apartment block in a dense-urban model.

In FIG. 7, consider a scenario with simulation assumptions that illustrates aspects of the disclosed innovation. In this disclosure, a dense-urban model 700 corresponds to densely-populated areas where there are multi-floor apartment buildings 702a, 702b with smaller size apartment units 704. The description of the dense-urban model is as follows.

In the dense-urban model 700, blocks of apartments are dropped into the three center cells of a macro cell layout with Inter-Site Distance (ISD) of 1 km. Each block is 50 m×50 m and consists of two buildings (north and south) 702a, 702b and a horizontal street 706 between them as shown in FIG. 7. The width of the street is 10 meters. Each building has K floors. K is chosen randomly between 2 and 6. In each floor, there are 10 apartment units in two rows of five. Each apartment is 10 m×10 m (i.e., approximately 1076 square feet) and has a one-meter-wide balcony. The minimum separation between two adjacent blocks is 10 m. The probability that a Home User Equipment (HUE) (e.g., femto cell) is in the balcony is assumed to be 10%. Two thousand (2000) apartment units are dropped in each cell which corresponds to a 6928 households per square kilometer. This represents a dense-urban area. Taking into account various factors such as wireless penetration (80%), operator penetration (30%) and Home Base Node (HNB) penetration (20%), a 4.8% HNB penetration is assumed which means 96 of the 2000 apartments in each cell have a HNB installed from the same operator. Out of these, 24 HNBs are simultaneously active (have a HUE in connected mode). If a HNB is active, it will transmit at full power; otherwise it will transmit only the pilot and overhead channels.

A plurality of Mobile User Equipment (MUEs) are also dropped randomly into the three center cells of the 57-cell macro layout such that 30% of the MUEs are indoor. In addition, a minimum path loss of 38 dB is enforced between UEs and HNBs (i.e., one-meter separation). In the dense-urban model, the 3GPP micro-urban model is used for the outdoor path loss computation of UMTS 30.03 (i.e., Universal Mobile Telecommunications System (UMTS), Requirements for the UMTS Terrestrial Radio Access System (UTRA) ETSI Technical Report, UMTS 30.03 version 3.1.0, November 1997). The free-space component for the micro-urban model is given by $PL_{fs,micro}(dB) = 28 + 40 \log_{10} d$ Other propagation models: Interference management is crucial for enabling Home NodeB (HNB) deployment. At the same time, the conclusions of any interference management study depend heavily on the underlying propagation model. In one aspect, a HNB propagation model is described that is useful for studying inter-HNB interference scenarios. In another aspect, a HNB-macro propagation model is described for studying HNB-macro interference issues.

HNB Apartment Building Model: For studying inter-HNB interference scenarios, the following apartment model is proposed. Consider a 3 floor building with 25 apartments per floor. The apartments are 10 m×10 m and are placed next to each other on a 5×5 grid on each floor. The floor separation is assumed to be 4 meters. In addition, assume that, with probability p, there is a HNB in each apartment. This probability represents the density of HNB deployment. For the apartments that have a HNB, the HNB and HUE are dropped randomly and uniformly in the apartment with a minimum separation of one meter. Then a modified version of the Keenan-Motley model is used to calculate the propagation loss from each Home UE (HUE) to every HNB:

$$PL(dB) = 20\log_{10}\left(\frac{4\pi f}{c}\right) + 20\log_{10} d + q_{in} W_{in} + q_{ex} W_{ex} + Fn^{(n+2)/(n+1)-0.46}$$ Eqn. (1)

where
f is the carrier frequency in Hz,
c is the speed of light in m/s,
d is the distance between transmitter and receiver in meters,
$W_{in}$ is the partition loss corresponding to internal walls (e.g., within an apartment) in dB,
$q_{in}$ is a random variable representing the total number of internal walls between transmitter and receiver,
$W_{ex}$ is the partition loss representing the total number of internal walls between transmitter and receiver,
$q_{ex}$ is a random variable representing the total number of external walls between transmitter and receiver,
F is the floor loss in dB,
n is number of floors separating transmitter and receiver.
The partition losses, $W_{in}$, $W_{ex}$ and F, are assumed to be fixed whereas $q_{in}$ and $q_{ex}$ are assumed to be random to capture variations in apartment layouts. The total number of walls between the transmitter and receiver, $q = q_{in} + q_{ex}$, is a random number chosen from the set $$\left\{0, 1, \ldots, \left\lfloor\frac{d}{d_w}\right\rfloor\right\}$$

with equal probability. Here, d, represents the minimum wall separation. Note that the average distance between two partitions is approximately equal to $2d_w$. Given the value of q, the numbers of internal and external walls are calculated as follows.

$q_{in} = q$ and $q_{ex} = 0$ if the transmitter and receiver are in the same apartment; and $q_{ex} = \max(1, \lfloor q/k \rfloor)$ and $q_{in} = \max(0, q-q_{ex})$ if the transmitter and receiver are in different apartments. Here, k represents the average number of internal walls per external wall. For our apartment model k is equal to $10/d_w$. The values suggested for the above parameters are given in the table below.

TABLE 1

List of parameters for the apartment model.

| Parameter | Value |
| --- | --- |
| $W_{in}$ | 5 dB |
| $W_{ex}$ | 5 dB |
| F | 18.3 dB |
| $d_w$ | 2 m |
| k | 5 |
| f | $2 \times 10^9$ Hz |
| c | $3 \times 10^8$ m/s |

HNB-Macro Propagation Model: For studying the interactions between HNBs and Macro NBs (MNBs), the following HNB-macro model is proposed. M HNB houses (i.e., A HNB house is a house in which there is a HNB) of size 12 m×12 m are dropped inside each macrocell. A HNB is dropped randomly and uniformly inside each house. Corresponding to each HNB, a HUE is dropped randomly such that, with probability $p_{HUE}$, the HUE is inside the house and, with probability $1-p_{HUE}$, the HUE is outside the house in the yard. The total lot size (including the yard) is assumed to be 24 m×24 m. As the HNB houses and HUEs are dropped, the houses are made not overlap and no HUE is inside a neighbor's house. Then N macro UEs (MUEs) are dropped inside each macrocell. Assume with probability $p_{MUE}$ that the MUE is inside a macro house (i.e., macro house is a house in which there is no HNB/HUE but there is a MUE) in which case a macro house is dropped for that UE. The macro houses have the same size as the HNB houses (i.e., 12 m×12 m). The houses are made not overlap and also no HUE is inside a macro house. However, a MUE is not prevented from being inside a HNB house. In addition, a minimum path loss of X dB is enforced between MUEs and HNBs. In other words, if a MUE is within X dB of a HNB in terms of path loss, the MUE is redropped.

Based on the above model, the various propagation losses are computed as described in the following sections. TABLE 2 summarizes the path loss computations for various scenarios.

TABLE 2

Summary of path Loss computation for HNB-macro propagation model.

| Cases | | Path Loss (dB) |
|---|---|---|
| MUE to MNB | MUE is outside | 3GPP macrocell model described in Annex A of 3GPP TR 25.896 v6.0.0 |
| | MUE is inside a house | $PL_{macro}^{(v)} + aR + qW + L_{ow}$ with $q \in \left\{0, 1, \ldots, \left\lfloor \frac{R}{d_w} \right\rfloor\right\}$ |
| HUE to MNB | HUE is outside | 3GPP macrocell model described in Annex A of 3GPP TR 25.896 v6.0.0 |
| | HUE is inside a house | $PL_{macro}^{(v)} + aR + qW + L_{ow}$ with $q \in \left\{0, 1, \ldots, \left\lfloor \frac{R}{d_w} \right\rfloor\right\}$ |
| MUE to HNB | MUE is inside the same house as HNB | $37 + 20\log_{10}d + qW$ with $q \in \left\{0, 1, \ldots, \left\lfloor \frac{d}{d_w} \right\rfloor\right\}$ |
| | MUE is outside | $\max(15.3 + 37.6\log_{10}d, 37 + 20\log_{10}d) + qW + L_{ow}$ with $q \in \left\{0, 1, \ldots, \left\lfloor \frac{\hat{d}}{d_w} \right\rfloor\right\}$ |
| | MUE is inside a different house | $\max(15.3 + 37.6\log_{10}d, 37 + 20\log_{10}d) + qW + L_{ow}^{(1)} + L_{ow}^{(2)}$ with $q \in \left\{0, 1, \ldots, \left\lfloor \frac{\hat{d}_1 + \hat{d}_2}{d_w} \right\rfloor\right\}$ |
| HUE to HNB | HUE is inside the same house as HNB | $37 + 20\log_{10}d + qW$ with $q \in \left\{0, 1, \ldots, \left\lfloor \frac{d}{d_w} \right\rfloor\right\}$ |
| | HUE is outside | $\max(15.3 + 37.6\log_{10}d, 37 + 20\log_{10}d) + qW + L_{ow}$ with $q \in \left\{0, 1, \ldots, \left\lfloor \frac{\hat{d}}{d_w} \right\rfloor\right\}$ |
| | HUE is inside a different house | $\max(15.3 + 37.6\log_{10}d, 37 + 20\log_{10}d) + qW + L_{ow}^{(1)} + L_{ow}^{(2)}$ with $q \in \left\{0, 1, \ldots, \left\lfloor \frac{\hat{d}_1 + \hat{d}_2}{d_w} \right\rfloor\right\}$ |

Propagation Loss from MUEs to Macro NodeBs (MNBs): (A) If the MUE is outside, the macrocell propagation model described in Annex A of 3GPP TR 25.896 v6.0.0, "Feasibility Study for Enhanced Uplink for UTRA FDD" is used. (B) If the MUE is inside a house, a model similar to the indoor-outdoor model described in Section 5.2.1 of 3GPP TR 25.951 v7.0.0, "FDD Base Station (BS) classification" can be used. More specifically, the MUE is projected into four virtual UEs located at the edges of the house. The path loss is then computed as $$PL(dB) = PL_{macro}^{(v)} + aR + qW + L_{ow} \qquad \text{Eqn. (2)}$$

where $PL_{macro}^{(v)}$ is the path loss from a MNB to the virtual UE, R is the distance between the MUE and the virtual UE, q is the total number of walls between the MUE and the virtual UE, W is the wall partition loss which is set to 5 dB, a is the attenuation coefficient equal to 0.8 dB/m, and $L_{ow}$ is the outdoor penetration loss. Similar to the HNB model described in Section 2.1, assume that q is a random number chosen from the set $$\left\{0, 1, \ldots, \left\lfloor \frac{R}{d_w} \right\rfloor\right\}$$

with equal probability where $d_w$ is again set to 2 m. In addition, assume that $L_{ow}$ is 10 dB with probability 0.8 and is equal to 2 dB with probability 0.2 to account for windows. The path loss corresponding to each of the four virtual UEs according to Eqn. (2) is calculated, and the smallest one is chosen.

Propagation Loss from HUEs to MNBs: The propagation loss from a HUE to a MNB can be calculated in the same way as the one just described.

Propagation Loss from MUEs to HNBs: (A) If the MUE is inside the same house as the HNB, Eqn. (1) is used to compute the path loss. (B) If the MUE is outside, the path loss is computed as $$PL(dB) = PL_{fs} + qW + L_{ow} \qquad \text{Eqn. (3)}$$

where $PL_{fs}$ is the free space loss given by $$PL_{fs}(dB) = \max(15.3 + 37.6 \log_{10} d, 37 + 20 \log_{10} d) \qquad \text{Eqn. (4)}$$

with d being the distance between the MUE and HNB in meters. Here, q is the total number of walls between the MUE and the HNB, W is the wall partition loss and $L_{ow}$ is the outdoor penetration loss. In this case, q is a random number chosen from the set $$\left\{0, 1, \ldots, \left\lfloor \frac{\hat{d}}{d_w} \right\rfloor\right\}$$

where $\hat{d}$ is the portion of d inside the house.

(C) If the MUE is inside a different house than the HNB, the path loss is calculated as $$PL(dB) = PL_{fs} + qW + L_{ow}^{(1)} + L_{ow}^{(2)} \qquad \text{Eqn. (5)}$$

where $PL_{fs}$ is given by (4), $L_{ow}^{(1)}$ and $L_{ow}^{(2)}$ are the penetration losses for the two houses, and q is a random number chosen from the set $$\left\{0, 1, \ldots, \left\lfloor \frac{\hat{d}_1 + \hat{d}_2}{d_w} \right\rfloor\right\}.$$

Here, $\hat{d}_1$ and $\hat{d}_2$ are the portions of d inside the two houses.

Propagation Loss from HUEs to HNBs: The propagation loss from a HUE to a HNB can be calculated in a similar way as the one just described.

Thus, additional propagation models specific for studying inter-HNB and HNB-macro interference issues have been described.

Figure 8:
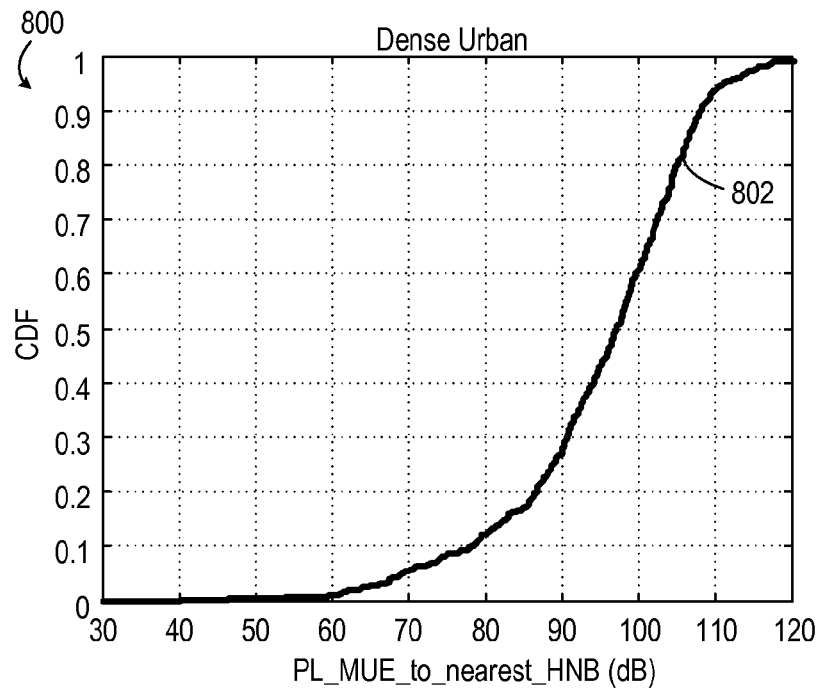
FIG. 8 depicts a graphical plot of distribution of path loss (PL) from a plurality of mobile user equipment (MUEs) to the nearest Home Base Node (HNB) for a dense-urban model.

In plot 800 depicted in FIG. 8, a Cumulative Density Function (CDF) 802 of path loss (PL) from mobile user equipment (MUE) to the closest Home Base Node (HNB) is shown in FIG. 8 for the dense-urban.

Figure 9:
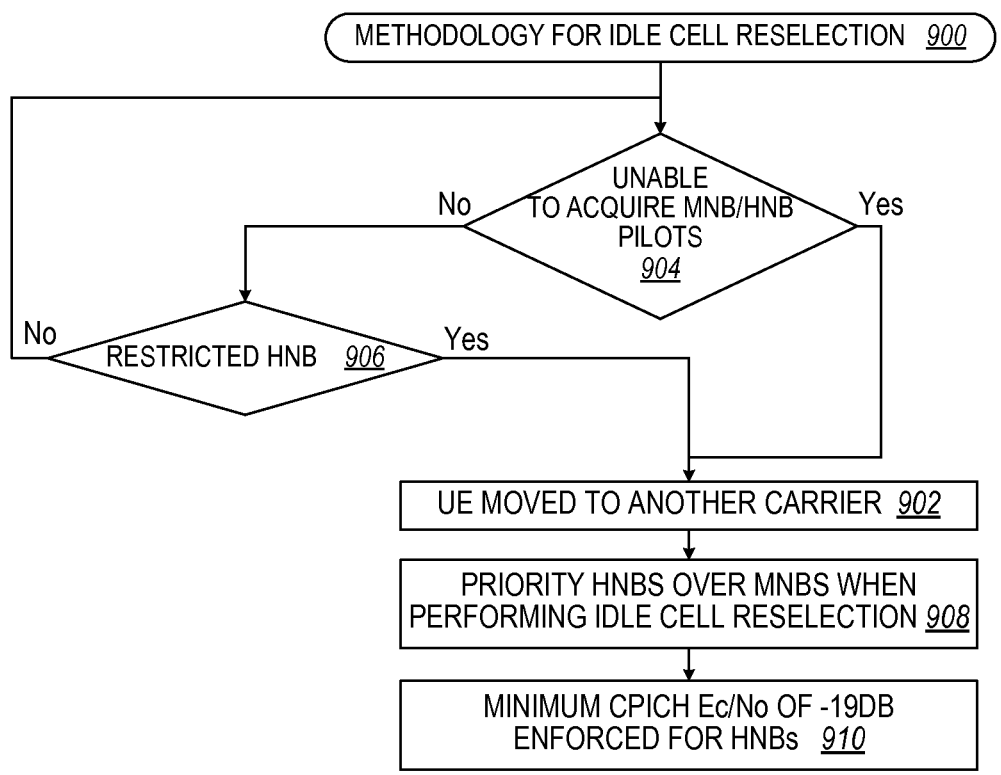
FIG. 9 illustrates a methodology or sequence of operations for an idle cell reselection procedure for determining whether a HUE is camped on its HNB or on a Mobile Base Node (MNB) or whether it is moved to another carrier.

Coverage Analysis with Calibrated HNB Transmit Power: One value of HNB transmit power does not work in all scenarios. Hence, HNB transmit power needs to be adapted to provide acceptable performance for HUEs and MUEs. The following algorithm can be used as a guideline to pick the HNB DL transmit power:

In FIG. 9, a methodology or sequence of operations 900 is depicted for an idle cell reselection procedure for determining whether a HUE is camped on its HNB or on a MNB or whether it is moved to another carrier. A HUE will be moved to another carrier (block 902) if it is not able to acquire the pilots of the HNB and MNB on the shared carrier (block 904). Similarly, the HUE will be moved to another node (block 904) if the HUE unsuccessfully attempts to perform an idle cell reselection to a neighbor HNB (e.g., restricted association) (block 906). Similarly, a MUE will be moved to another carrier if it is not able to acquire the macro pilot or if it (unsuccessfully) attempts to perform an idle cell reselection to a HNB (not shown). TABLE 3 summarizes representative idle cell reselection parameters used in our analysis. These parameters are set such that priority is given to HNBs over MNBs when a HUE is performing idle cell reselection (block 908). However, a minimum CPICH Ec/No of −19 dB is enforced for HNBs so that idle cell reselection to a HNB happens only when the HNB signal quality is good (block 910).

TABLE 3

Parameters for idle cell reselection procedure.
Parameters for idle cell reselection procedure

| SIB/Parameter | | Macro | HNB |
| --- | --- | --- | --- |
| SIB3 | Qqualmin | −18 dB | −18 dB |
| | Sintrasearch | 10 dB | 4 dB |
| | Sintersearch | NA | NA |
| SIB11 | Qhyst + | HNB cells: −50 dB | HNB cells: 3 dB |
| | Qoffset | Macro cells: 3 dB | Macro cells: 5 dB |
| | Qqualmin | HNB cells: −12 dB | Not needed |
| | | Macro cells: not needed | |

Figure 10:
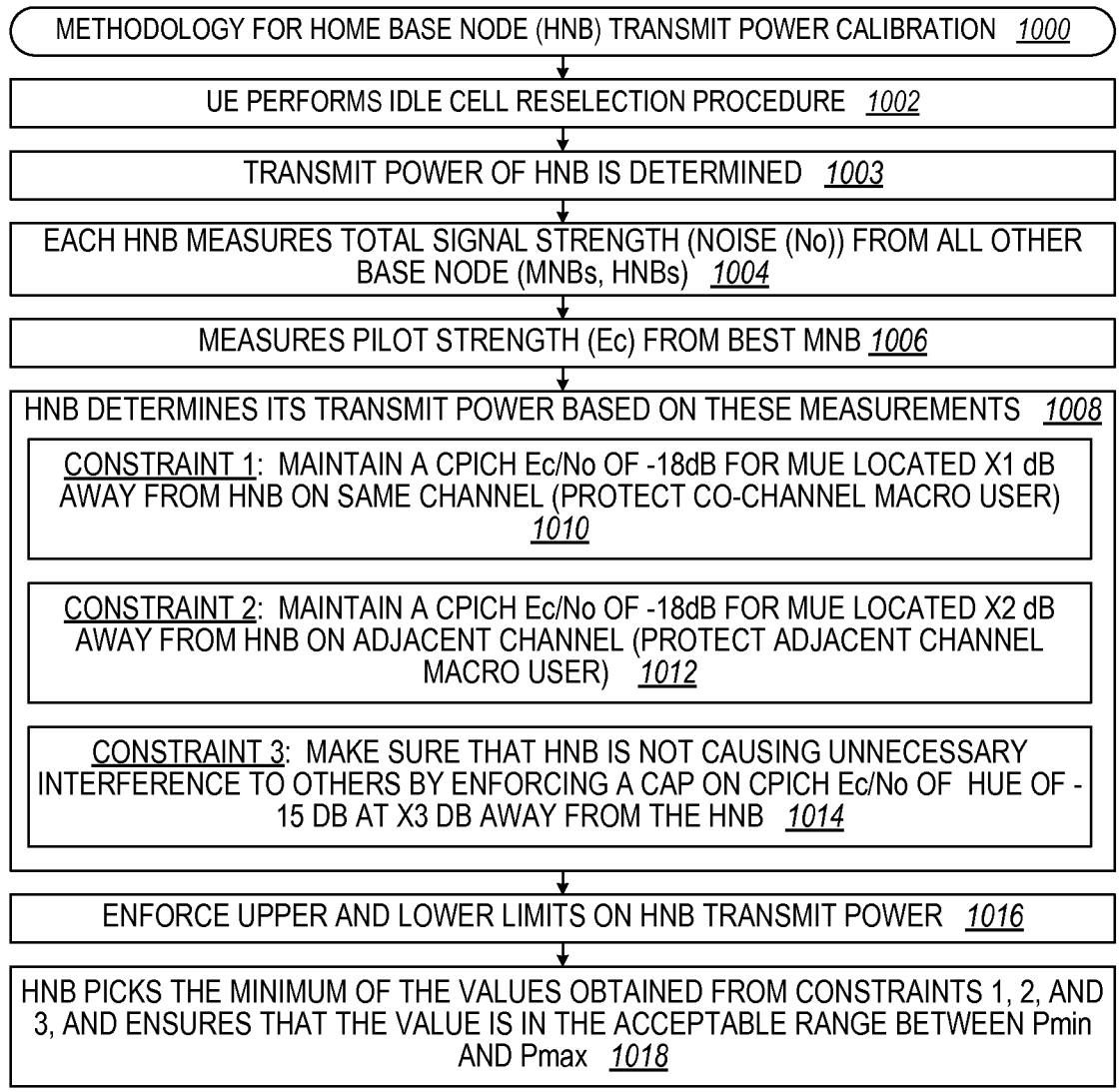
FIG. 10 illustrates a methodology or sequence of operations for HNB transmit power calibration.

In FIG. 10, a methodology or sequence of operations 1000 is provided for HNB transmit power calibration, which can be an algorithm implemented by at least one processor, stored on computer readable storage medium for causing a computer to execute the method, or components of an apparatus. Each UE performs an idle cell reselection procedure, such as described above (block 1002). The transmit power of HNB is determined as follows (block 1003). Each HNB measures the total signal strength (i.e., Noise (No)) from all of the other Base Node (NodeBs, including MNBs and HNBs) (block 1004). It also measures the pilot strength (Ec) from the best MNB (block 1006). Based on these measurements, the HNB determines its transmit power (block 1008):

Constraint 1: To maintain a CPICH Ec/No of −18 dB for a MUE located X1 dB away from the HNB on the same channel (i.e., protect the co-channel macro user) (block 1010);

Constraint 2: To maintain a CPICH Ec/No of −18 dB for a MUE located X2 dB away from the HNB on the adjacent channel (i.e., protect the adjacent channel macro user) (block 1012);

Constraint 3: To make sure that HNB is not causing unnecessary interference to others by enforcing a cap on CPICH Ec/No of the HUE of −15 dB at X3 dB away from the HNB (block 1014).

If HNB uses its own measurements for calibration of its transmit power this error could results in lower or higher transmit power values compared to optimum. As a practical method to prevent worst cases errors, certain upper and lower limits on HNB transmit power are enforced (block 1016).

In summary HNB picks the minimum of the values obtained from Constraints 1, 2, and 3, and ensures that the value is in the acceptable range (i.e., between Pmin and Pmax) (block 1018).

In this portion, performance of UEs is analyzed with calibrated HNB transmit power algorithm described above. For the algorithm, set X1=X3=80 dB. The second constraint in the algorithm is not applicable since assume single-frequency co-channel deployment here. TABLE 4 and TABLE 5 show the pilot acquisition and outage statistics for dense-urban model with calibrated HNB transmit power. Compare two cases:

Calibrated HNB transmit power with Pmin=0 dBm and Pmax=20 dBm;

Calibrated HNB transmit power with Pmin=−10 dBm and Pmax=20 dBm.

TABLE 4

Pilot acquisition statistics for dense-urban model with 24 active HNBs and calibrated HNB transmit power

| | Pmin = 0 dBm, Pmax = 20 dBm | Pmin = −10 dBm, Pmax = 20 dBm |
| --- | --- | --- |
| HUEs unable to acquire HNB pilot | 0.5% | 2.0% |
| HUEs unable to acquire HNB or macro pilot | 0.2% | 0.2% |
| MUEs unable to acquire macro pilot | 13.0% | 7.3% |

TABLE 5

Coverage statistics for dense-urban model with 24 active HNBs and calibrated HNB transmit power.

| | Pmin = 0 dBm, Pmax = 20 dBm | Pmin = −10 dBm, Pmax = 20 dBm |
| --- | --- | --- |
| MUEs moved to another carrier | 24.0% | 14.3% |
| HUEs in HNB outage | 2.4% | 5.0% |
| HUEs switched to macro on shared carrier | 1.1% | 3.6% |
| HUEs moved to another carrier | 1.3% | 1.4% |

Figure 11:
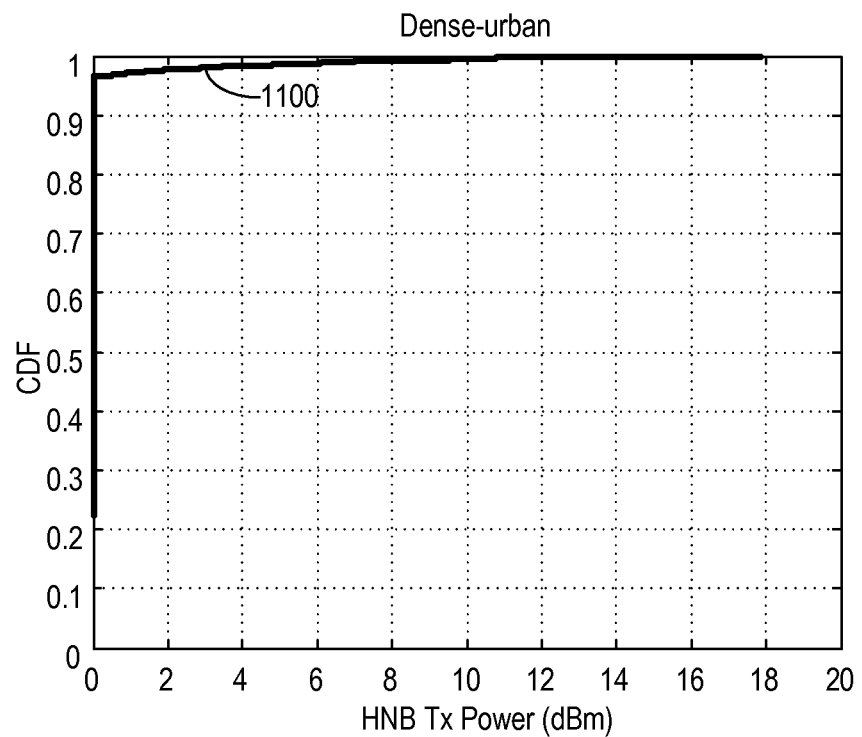
FIG. 11 illustrates a graphical plot of a Home Base Node (HNB) transmit power Cumulative Density Function (CDF) for a dense-urban scenario with minimum power Pmin=0 dBm and maximum power Pmax=20 dBm.
Figure 12:
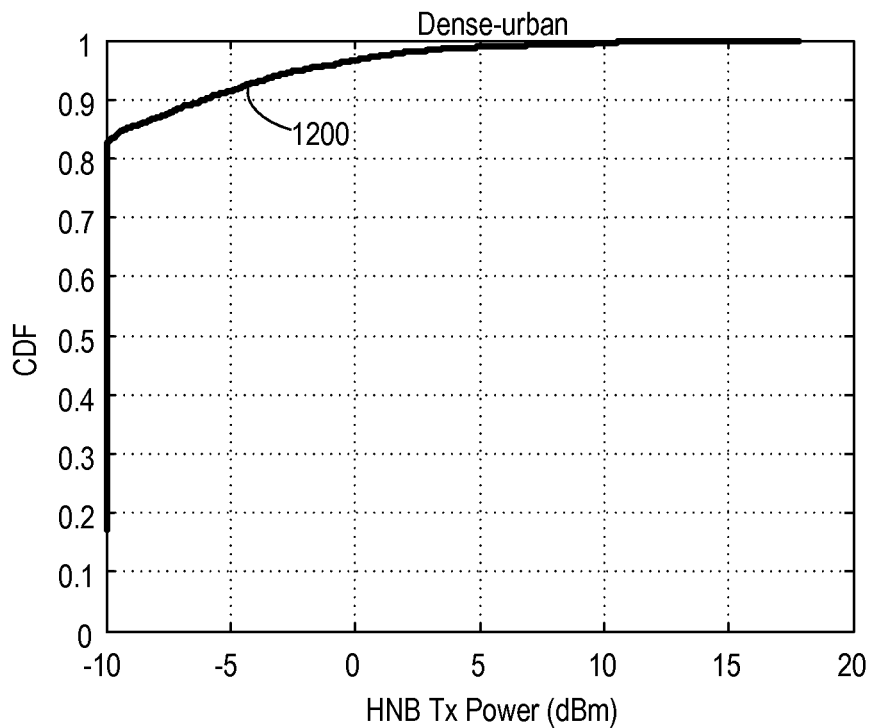
FIG. 12 illustrates a graphical plot of a transmit power CDF for a dense-urban scenario with Pmin=−10 dBm and Pmax=20 dBm.

The HNB transmit power CDFs 1100, 1200 are also shown respectively in FIG. 11 and FIG. 12.

It is seen that in dense-urban model, a significant number of HNBs hit the minimum −10 dBm transmit power (FIG. 12). Limiting minimum HNB power to 0 dBm will result in significant coverage hole for the macro. As shown in TABLE 5, 24% of MUEs will switch to another frequency with 0 dBm HNB Tx power compared to 14% with −10 dBm Tx power. This suggests that the lower limit for the total HNB Tx power should be set below 0 dBm to limit the coverage hole created for the macrocell downlink. This will result in CPICH power levels below the −10 dBm minimum for Primary CPICH Tx Power that can currently be signaled to a UE as specified in TS 25.331 (i.e., 3GPP TS 25.331 v8.3.0, "Radio Resource Control (RRC); Protocol specification"), as understood by one skilled in the art.

In this disclosure, the impact has been studied of HNB minimum total Tx power level on the coverage hole created for macro downlink performance in a co-channel deployment where HUEs and MUEs share the same carrier. The HNB transmit power has been shown to need to go lower than 0 dB to limit the coverage hole for macro. This can result in a CPICH Tx power below −10 dBm. The CPICH Tx power is signaled to the UE by RRC and is used by the UE to estimate the path loss to the NodeB. The estimated path loss is used by the UE for determining the its initial Tx power for RACH:

Preamble_Initial_Power=Primary CPICH Tx power−CPICH_RSCP+UL interference+Constant Value Currently, the lowest CPICH power level that can be signaled to the UE is −10 dBm as specified in 3GPP TS 25.331 v8.3.0, "Radio Resource Control (RRC); Protocol specification". When the HNB CPICH Tx power is below −10 dBm, the estimated path loss by the HUE (i.e., Primary CPICH Tx power−CPICH_RSCP) will be higher than the actual path loss. This will result in a higher Tx power by the HUE than necessary. The increase in the HUE Tx power will expedite the access but at same time causes unnecessary interference for the macro uplink. To get around this, the HNB can use the Constant Value parameter to compensate for the mismatch between the actual CPICH Tx power level and the one signaled to the HUE. In TS 25.331, the allowed range for the Constant Value parameter is specified as [−35 dB ... −10 dB]. The Constant Value signaled to the HUE can be made lower than the desired target to offset the increase in the estimated path loss resulted from the mismatch in CPICH Tx power In summary, the HNB total Tx power may need to go below 0 dBm to limit the coverage hole created for macro downlink. This could result in a HNB CPICH Tx power below −10 dBm which is the lowest level that currently can be signaled to the UE and, hence, an error in the path loss estimated by the HUE. However, the mismatch can be compensated by adjusting the Constant Value parameter that is signaled to the HUE by the HNB for RACH.

By virtue of the foregoing, in one aspect, an apparatus is provided that is operable in wireless communication system. Means are provided for receiving a pilot channel signal transmitted at a first power level. Means are provided for receiving an indication that the pilot channel signal was transmitted at a second power level, wherein the first power level and the second power level are different. Means are provided for receiving a constant value used in adjusting a preamble initial power value. Means are provided for adjusting the preamble initial power value using the constant value, the first power level, and the second power level.

In another aspect, a method is provided that is used in wireless communication system. A pilot channel signal is received that is transmitted at a first power level. An indication is received that the pilot channel signal was transmitted at a second power level, wherein the first power level and the second power level are different. A constant value is received used in adjusting a preamble initial power value. The preamble initial power value is adjusted using the constant value, the first power level, and the second power level. An electronic device can be configured to execute this method. An electronic device can be provided that is configured to execute the method.

In an additional aspect, a machine-readable medium comprises instructions which, when executed by a machine, cause the machine to perform operations including receiving a pilot channel signal transmitted at a first power level; receiving an indication that the pilot channel signal was transmitted at a second power level, wherein the first power level and the second power level are different; receiving a constant value used in adjusting a preamble initial power value; and adjusting the preamble initial power value using the constant value, the first power level, and the second power level.

Figure 13:
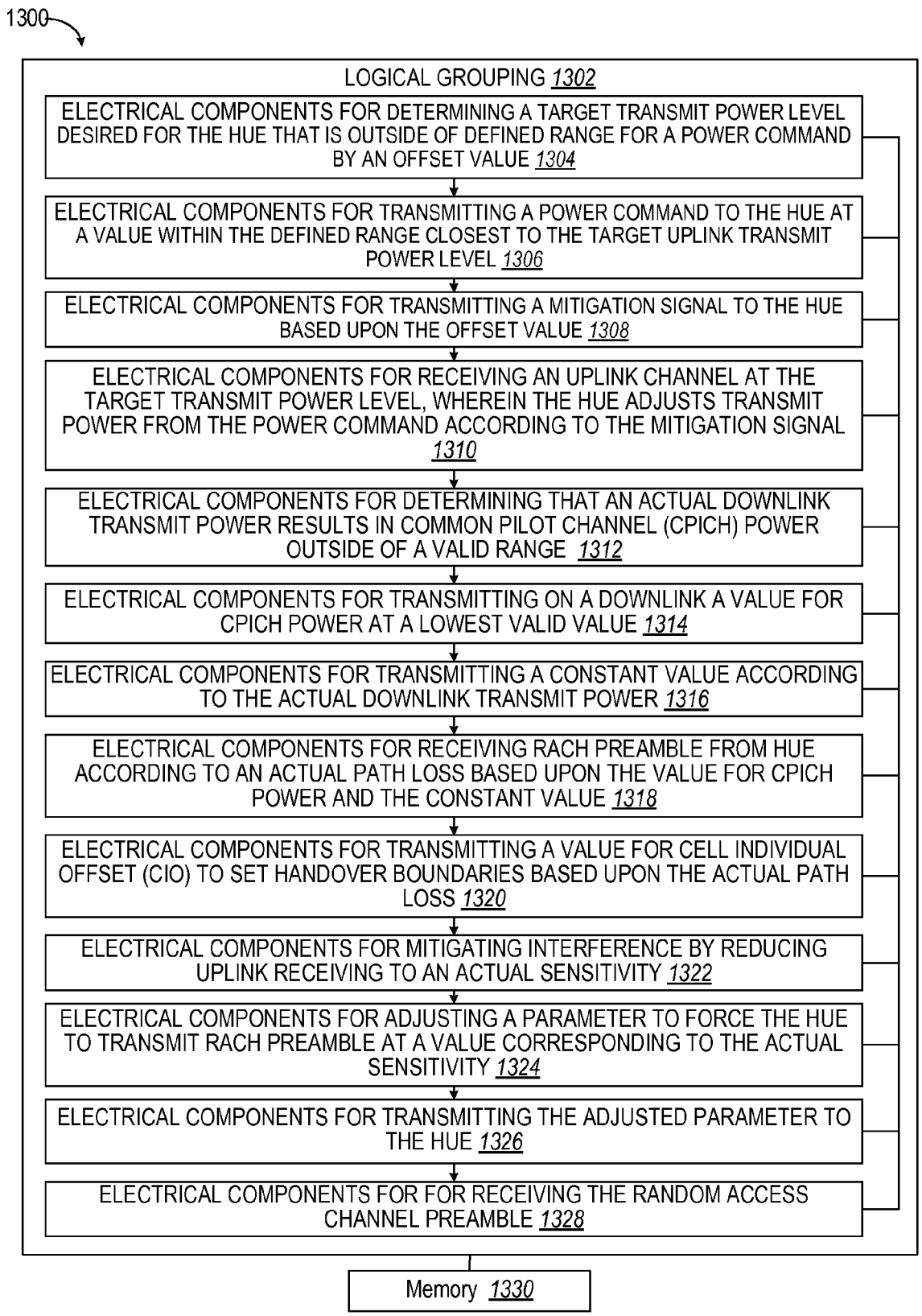
FIG. 13 depicts a block diagram of a logical grouping of electrical components for signaling transmit power outside of a defined range.

With reference to FIG. 13, illustrated is a system 1300 for signaling transmit power outside of a defined range, in particular for signaling on a downlink an uplink transmit power in a closed subscriber system. For example, system 1300 can reside at least partially within user equipment (UE). It is to be appreciated that system 1300 is represented as including functional blocks that represent functions implemented by a computing platform, processor, software, or combination thereof (e.g., firmware). System 1300 includes a logical grouping 1302 of electrical components that can act in conjunction. For instance, logical grouping 1302 can include an electrical component for determining a target transmit power level that is desired for the HUE that is outside of defined range for a power command by an offset value 1304. Moreover, logical grouping 1302 can include an electrical component for transmitting a power command to the HUE at a value within the defined range that is closest to the target uplink transmit power level 1306. Logical grouping 1302 can include an electrical component for transmitting a mitigation signal to the HUE based upon the offset value 1308. Logical grouping 1302 can include an electrical component for receiving an uplink channel at the target transmit power level, wherein the HUE adjusts transmit power from the power command according to the mitigation signal 1310. Logical grouping 1302 can include an electrical component for determining that an actual transmit power that results in Common Pilot Channel (CPICH) power outside of a valid range 1312. Logical grouping 1302 can include an electrical component for transmitting on a downlink a value for CPICH power at a lowest valid value 1314. Logical grouping 1302 can include an electrical component for transmitting a constant value according to the actual transmit power 1316. Logical grouping 1302 can include an electrical component for receiving a Random Access Channel (RACH) preamble from HUE according to an actual path loss based upon the value for CPICH power and the constant value 1318. Logical grouping 1302 can include an electrical component for transmitting a value for Cell Individual Offset (CIO) to set handover boundaries based upon the actual path loss 1320. Logical grouping 1302 can include an electrical component for mitigating interference by reducing uplink receiving to an actual sensitivity 1322. Logical grouping 1302 can include an electrical component for adjusting a parameter (e.g., uplink interference, constant values, etc.) to force the HUE to transmit RACH preamble at a value corresponding to the actual sensitivity 1324. Logical grouping 1302 can include an electrical component for transmitting the adjusted parameter to the HUE 1326. Logical grouping 1302 can include an electrical component for receiving the random access channel preamble 1328. Additionally, system 1300 can include a memory 1330 that retains instructions for executing functions associated with electrical components 1304-1328. While shown as being external to memory 1320, it is to be understood that one or more of electrical components 1304-1328 can exist within memory 1330.

Figure 14:
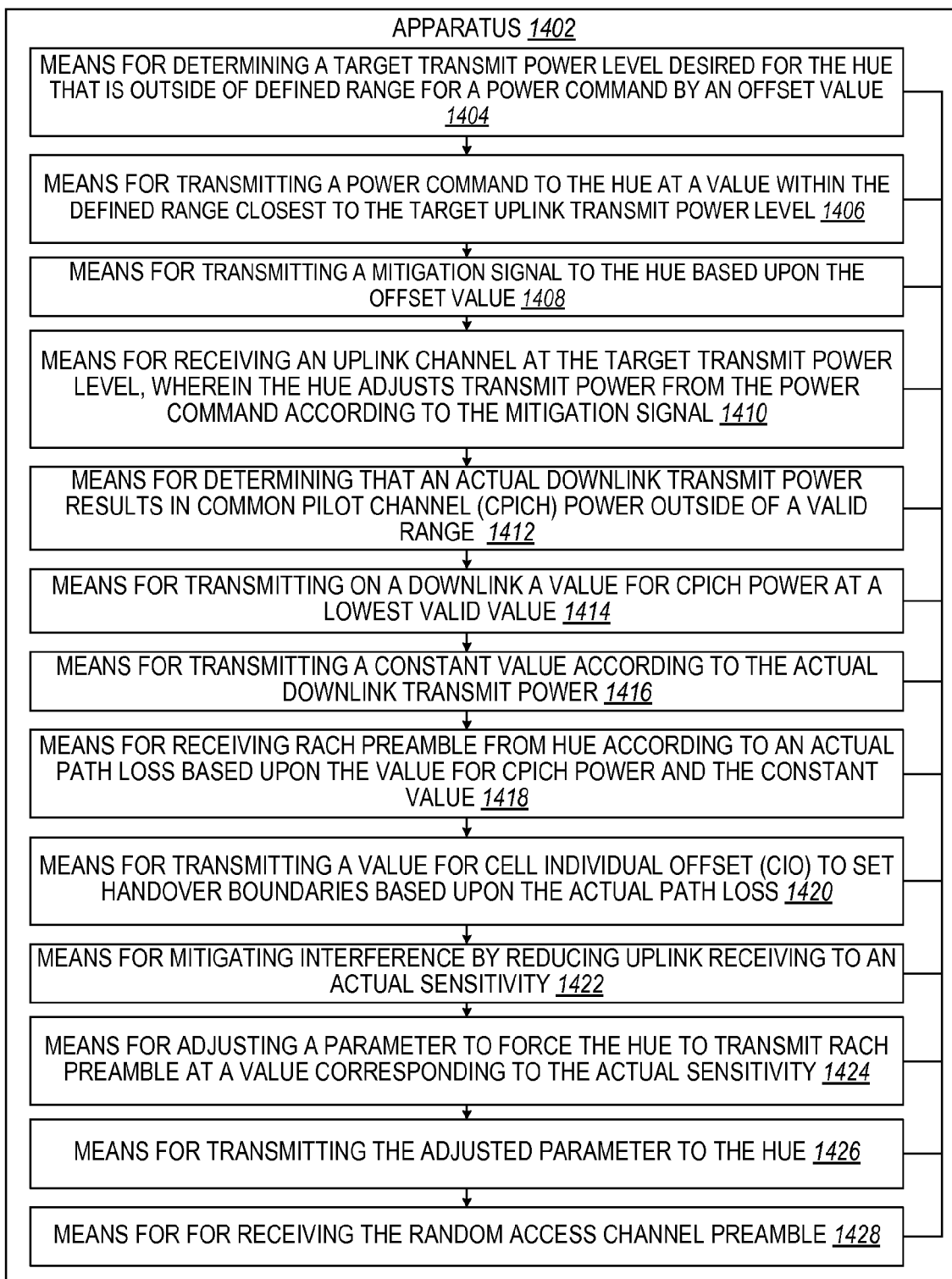
FIG. 14 depicts a block diagram of an apparatus having means for signaling transmit power outside of a defined range.

In FIG. 14, an apparatus 1402 is depicted for signaling transmit power outside of a defined range, in particular for signaling on a downlink an uplink transmit power in a closed subscriber system. Means 1404 are provided for determining a target transmit power level that is desired for the HUE that is outside of defined range for a power command by an offset value. Means 1406 are provided for transmitting a power command to the HUE at a value within the defined range that is closest to the target uplink transmit power level. Means 1408 are provided for transmitting a mitigation signal to the HUE based upon the offset value. Means 1410 are provided for receiving an uplink channel at the target transmit power level, wherein the HUE adjusts transmit power from the power command according to the mitigation signal. Means

1412 are provided for determining that an actual transmit power that results in Common Pilot Channel (CPICH) power outside of a valid range. Means 1414 are provided for transmitting on a downlink a value for CPICH power at a lowest valid value. Means 1416 are provided for transmitting a constant value according to the actual transmit power. Means 1418 are provided for receiving a Random Access Channel (RACH) preamble from HUE according to an actual path loss based upon the value for CPICH power and the constant value. Means 1420 are provided for transmitting a value for Cell Individual Offset (CIO) to set handover boundaries based upon the actual path loss. Means 1422 are provided for mitigating interference by reducing uplink receiving to an actual sensitivity. Means 1424 are provided for adjusting a parameter (e.g., uplink interference, constant values, etc.) to force the HUE to transmit RACH preamble at a value corresponding to the actual sensitivity. Means 1426 are provided for transmitting the adjusted parameter to the HUE. Means 1428 are provided for receiving the random access channel preamble.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Furthermore, the one or more versions may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

The steps of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers. The term article of manufacture, as used herein, is intended to encompass a computer program accessible from any computer-readable device, carrier, or media.

It should be appreciated that any patent, publication, or other disclosure material, in whole or in part, that is said to be incorporated by reference herein is incorporated herein only to the extent that the incorporated material does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein, will only be incorporated to the extent that no conflict arises between that incorporated material and the existing disclosure material.

What is claimed is:

1. A method comprising:
   determining an actual transmit power for a common pilot signal of a Home Base Node (HNB) operating in accordance with a communication protocol;
   comparing the actual transmit power to a valid range of transmit powers defined for the communication protocol;
   determining that the actual transmit power results in common pilot channel power outside of the valid range based on the comparison;
   transmitting on a downlink a value for common pilot channel power at a lowest valid value in the valid range;
   transmitting a constant value based on the actual transmit power and the lowest valid value; and
   receiving a random access channel preamble from user equipment according to an actual path loss based upon the value for common pilot channel power and the constant value.

2. The method of claim 1, further comprising transmitting a value for cell individual offset to set handover boundaries based upon the actual path loss.

3. The method of claim 1, further comprising signaling in accordance with a Third Generation Partnership Project (3GPP) telecommunication standard.

4. The method of claim 1, further comprising authenticating the user equipment as part of a closed subscriber system.

5. A computer program product comprising:
   at least one non-transitory computer readable storage medium storing computer executable instructions that, when executed by at least one processor, implement components comprising:
   a set of codes for determining an actual transmit power for a common pilot signal of a Home Base Node (HNB) operating in accordance with a communication protocol;
   a set of codes for comparing the actual transmit power to a valid range of transmit powers defined for the communication protocol;
   a set of codes for determining that the actual transmit power results in common pilot channel power outside of the valid range based on the comparison;
   a set of codes for transmitting on a downlink a value for common pilot channel power at a lowest valid value in the valid range;
   a set of codes for transmitting a constant value based on the actual transmit power and the lowest valid value; and
   a set of codes for receiving a random access channel preamble from user equipment according to an actual path loss based upon the value for common pilot channel power and the constant value.

6. An apparatus comprising:
   means for determining an actual transmit power for a common pilot signal of a Home Base Node (HNB) operating in accordance with a communication protocol;
   means for comparing the actual transmit power to a valid range of transmit powers defined for the communication protocol;
   means for determining that the actual transmit power results in common pilot channel power outside of the valid range based on the comparison;
   means for transmitting on a downlink a value for common pilot channel power at a lowest valid value in the valid range;
   means for transmitting a constant value based on the actual transmit power and the lowest valid value; and
   means for receiving a random access channel preamble from user equipment according to an actual path loss based upon the value for common pilot channel power and the constant value.

7. An apparatus comprising:
   a computing platform for determining an actual transmit power for a common pilot signal of a Home Base Node (HNB) operating in accordance with a communication protocol, for comparing the actual transmit power to a valid range of transmit powers defined for the communication protocol, and for determining that the actual transmit power results in common pilot channel power outside of the valid range based on the comparison;
   a transmitter for transmitting on a downlink a value for common pilot channel power at a lowest valid value in the valid range and for transmitting a constant value based on the actual transmit power and the lowest valid value; and
   a receiver for receiving a random access channel preamble from user equipment according to an actual path loss based upon the value for common pilot channel power and the constant value.

8. The apparatus of claim 7, wherein the transmitter is further for transmitting a value for cell individual offset to set handover boundaries based upon the actual path loss.

9. The apparatus of claim 7, wherein the transmitter is further for transmitting in accordance with a Third Generation Partnership Project (3GPP) telecommunication standard.

10. The apparatus of claim 7, wherein the computing platform is further for authenticating the user equipment as part of a closed subscriber system.

* * * * *